US012028442B2

(12) United States Patent
Cheng et al.

(10) Patent No.: US 12,028,442 B2
(45) Date of Patent: Jul. 2, 2024

(54) ACCESSING SECURITY HARDWARE KEYS

(71) Applicant: F5, Inc., Seattle, WA (US)

(72) Inventors: Liang Cheng, Los Altos, CA (US); Andrey Jivsov, Mountain View, CA (US); Neha Kochar, Ontario (CA)

(73) Assignee: F5, Inc., Seattle, WA (US)

( * ) Notice: Subject to any disclaimer, the term of this patent is extended or adjusted under 35 U.S.C. 154(b) by 21 days.

(21) Appl. No.: 16/541,981

(22) Filed: Aug. 15, 2019

(65) Prior Publication Data

US 2021/0051002 A1 Feb. 18, 2021

(51) Int. Cl.
*H04L 9/08* (2006.01)
*H04L 9/30* (2006.01)

(52) U.S. Cl.
CPC .......... *H04L 9/0819* (2013.01); *H04L 9/0894* (2013.01); *H04L 9/30* (2013.01)

(58) Field of Classification Search
CPC ....... H04L 9/0819; H04L 9/0894; H04L 9/30; H04L 9/0877; H04L 9/088; H04L 9/0891; H04L 9/0897
See application file for complete search history.

(56) References Cited

U.S. PATENT DOCUMENTS

| | | | |
|---|---|---|---|
| 8,543,830 B1 | 9/2013 | Khattar | |
| 9,209,974 B1* | 12/2015 | Akinyele | ................ H04L 9/088 |
| 2006/0190732 A1 | 8/2006 | Fery et al. | |
| 2006/0288232 A1 | 12/2006 | Ho et al. | |
| 2012/0102334 A1* | 4/2012 | O'Loughlin | ............ G06F 21/72 |
| | | | 713/189 |
| 2016/0105429 A1 | 4/2016 | Boenisch et al. | |
| 2016/0261408 A1 | 9/2016 | Peddada et al. | |

(Continued)

FOREIGN PATENT DOCUMENTS

CN 106470248 A * 3/2017 ......... H04L 41/0668

OTHER PUBLICATIONS

Oasis, PKCS #11 Cryptographic Token Interface Base Specification Version 2.40, Apr. 2015, available at: http://docs.oasis-open.org/pkcs11/pkcs11-base/v2.40/os/pkcs11-base-v2.40-os.pdf, 149 pages.

(Continued)

*Primary Examiner* — Mohammad W Reza
(74) *Attorney, Agent, or Firm* — Troutman Pepper Hamilton Sanders LLP (F5 In-House)

(57) ABSTRACT

Technology related to accessing security hardware keys is disclosed. In one example, a method includes receiving an initial request to perform a first cryptographic operation using a key stored in security hardware circuitry. In response to servicing the initial request, a persistent attribute of the key can be used to query the security hardware circuitry to receive a volatile attribute of the key. The volatile attribute of the key can be stored external to the security hardware circuitry to enable subsequent requests to perform cryptographic operations on the security hardware circuitry without querying the security hardware circuitry for the volatile attribute of the key. A subsequent request referencing the key can be received. The subsequent request can be serviced by using the security hardware circuitry and identifying the key using the stored volatile attribute of the key without querying the security hardware circuitry for the volatile attribute of the key.

22 Claims, 10 Drawing Sheets

(56) References Cited

U.S. PATENT DOCUMENTS

2017/0093818 A1*   3/2017  Dayka ................... H04L 63/06
2019/0342079 A1*  11/2019  Rudzitis ................ H04L 9/083
2020/0059373 A1*   2/2020  Norum ................. H04L 9/0897

OTHER PUBLICATIONS

European Search Report for corresponding European Patent Application No. 20191111.2, dated Feb. 1, 2021.
Communication pursuant to Article 94(3), EPC, dated Jan. 5, 2023, in corresponding EP Application No. 20191111.2-1218.

* cited by examiner

ACCESSING SECURITY HARDWARE KEYS

FIELD

This technology generally relates to network traffic management, and more specifically to offloading cryptographic operations associated with the network traffic.

BACKGROUND

A software application can be distributed or partitioned across different computing devices. For example, a client-server architecture can partition tasks between a client device (such as a laptop or mobile device) and one or more server computers connected by an interconnection network (such as the Internet) and managed by a provider of computing service(s) and/or computing resource(s). The server computer(s) can execute software applications to provide virtual resources, software services, and/or content to the client devices. For example, client devices can initiate communication sessions with the server computers by sending requests over the interconnection network to the server computers, and the servers can respond to the requests. Additionally or alternatively, the server computers can push information (without an initiating request) to the client devices over the interconnection network. As the number of client devices seeking access to the server computers increases, intermediary computing devices, such as network traffic management computing device(s), can be added between the client devices and the server computers. Network traffic management computing device(s) can perform security and/or routing functions of the client-server architecture, such as encrypting and/or decrypting traffic between the client and the server. For example, the network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a secure communications method implemented in cooperation with a network traffic management system including one or more network traffic management modules, networking modules, or server modules, the method including: receiving an initial request to perform a first cryptographic operation using a key stored in security hardware circuitry, the initial request identifying the key using a persistent attribute of the key. The secure communications method also includes, in response to servicing the initial request, using the persistent attribute of the key to query the security hardware circuitry to receive a volatile attribute of the key from the security hardware circuitry. The secure communications method also includes storing the volatile attribute of the key external to the security hardware circuitry to enable subsequent requests to perform cryptographic operations on the security hardware circuitry without querying the security hardware circuitry for the volatile attribute of the key. The secure communications method also includes receiving a subsequent request to perform a second cryptographic operation using the key stored in the security hardware circuitry, the subsequent request identifying the key using the persistent attribute of the key. The secure communications method also includes servicing the subsequent request by using the security hardware circuitry and identifying the key using the stored volatile attribute of the key without querying the security hardware circuitry for the volatile attribute of the key.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, or server modules, memory comprising programmed instructions stored thereon, and one or more processors configured to be capable of executing the stored programmed instructions to perform the actions of the methods. An example non-transitory computer readable medium having stored thereon instructions for secure communications comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

DETAILED DESCRIPTION

Overview

Figure 1A:
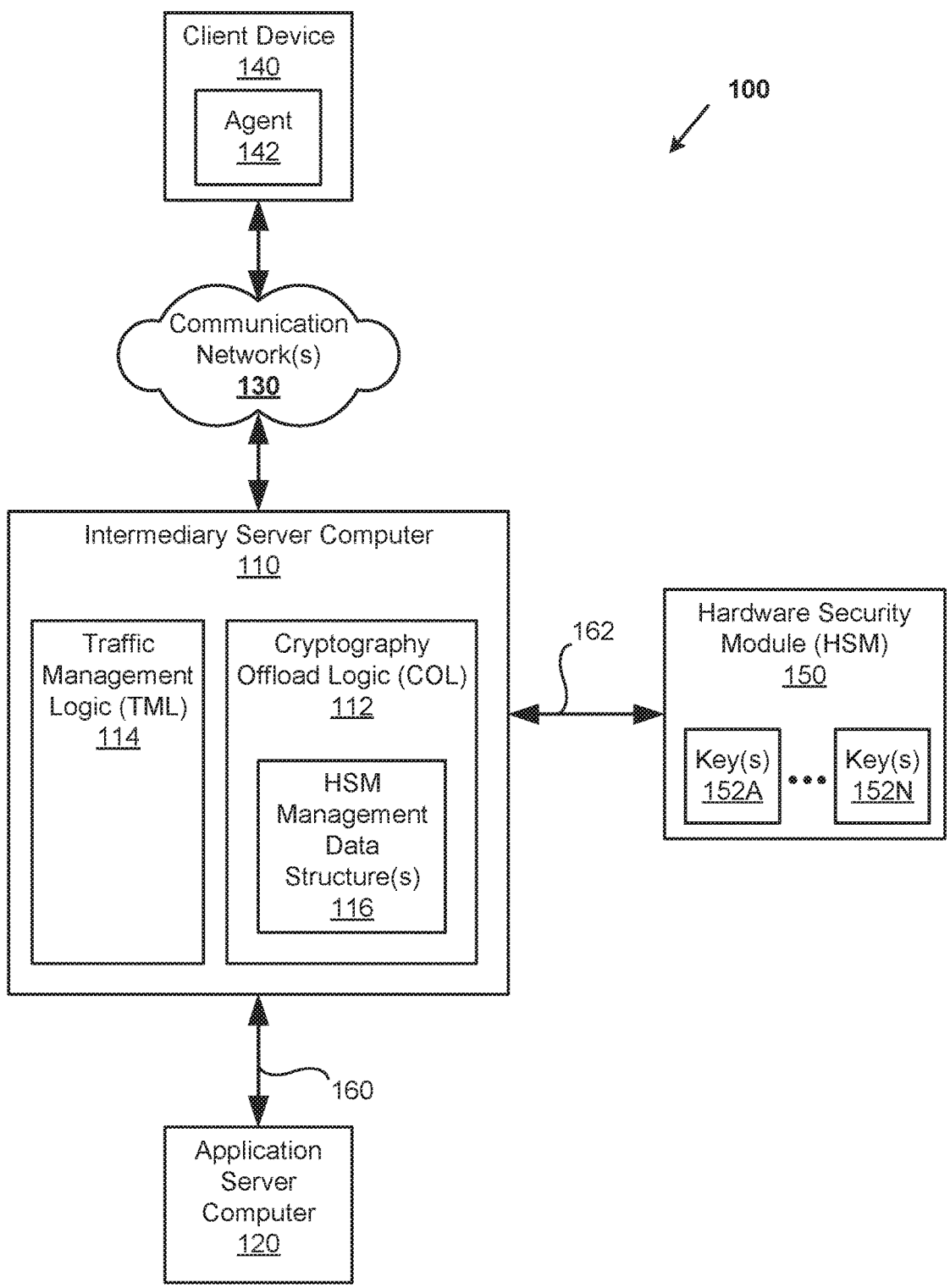
FIG. 1A is a block diagram of an example client-server architecture including an intermediary server computer and security hardware circuitry, such as a hardware security module.

Cryptography is the study of secure communications. Encryption is the reversible transformation of clear or unencrypted information (e.g., text, plaintext, or data) into data that is computationally infeasible to understand except for the sender or the intended recipient of the information. Decryption is the reversal of the encryption process, where encrypted information is transformed into unencrypted information. Encryption and decryption are performed using one or more cryptographic algorithms that can include one or more cryptographic operations. Cryptographic operations can include encoding information using a cryptographic key, decoding information using a cryptographic key, and generating a cryptographic key. Cryptographic keys are values (e.g., 128- or 256-byte numbers) that are selected based on their cryptographic properties. Cryptographic keys can be symmetric keys or asymmetric keys. When a symmetric key is used to encrypt information, the same symmetric key can be used to decrypt the information. Asymmetric keys come in groups (e.g., a public/private key pair). The group can include a private key and one or more public keys. Information that is encrypted with the private key can be decrypted with the corresponding public key(s). Information that is encrypted with one of the public keys can be decrypted with the corresponding private key. In order to keep encrypted information confidential, symmetric keys and private keys are safeguarded using various techniques. Encryption of communications can be used to increase security of a client-server architecture.

Intermediary server computers, such as network traffic management computing device(s), can perform security and/or routing functions of the client-server architecture, such as performing encryption and/or decryption operations for traffic flowing between the client and the server. Specifically, the intermediary server computer can act on behalf of the server, such as by encrypting traffic sent by the server, decrypting traffic that is destined for the server, and performing server-side operations of a handshake for exchanging cryptographic information with the client. For example, the intermediary server computer can facilitate and/or accelerate communications using the Hypertext Transfer Protocol Secure (HTTPS) protocol. Devices using the HTTPS protocol communicate using HTTP application layer protocol messages that are sent using network packets that are encrypted using the secure sockets layer (SSL) or transport layer security (TLS) protocols. SSL is a predecessor of TLS that performs similar functions as TLS. The TLS protocol is a cryptographic communications protocol for providing secure communications over a computer network. TLS uses a symmetric key for encryption and decryption that is generated for each connection using a handshake (also referred to as a TLS handshake) between the client (e.g., a browser) and the server (or the intermediary acting on behalf of the server) at the start of a session. A session is a communication channel between two or more communicating entities (e.g., the client and the server) that facilitates the exchange of information between the communicating entities. Sessions can be created using a handshake protocol that can be used to generate information (e.g., a session identifier and cryptographic key(s)) to enable and/or encrypt communications. A variety of computationally expensive cryptographic operations are performed during the TLS handshake, encryption, and decryption operations.

Specialized security hardware circuitry can potentially increase a performance of computationally expensive cryptographic operations. Security hardware circuitry can include a hardware security module (HSM). An HSM is computer hardware and/or software (e.g., a computing device) configured to store cryptographic keys, perform cryptographic operations (such as generating keys, encrypting data, and decrypting data), and enforce a security policy for using and/or accessing the cryptographic keys. For example, an HSM can include electronic circuitry for pipelining and/or accelerating various cryptographic algorithms. An HSM can include a physical enclosure that reduces a likelihood of observing and/or tampering with sensitive data, such as private keys of the server. For example, the enclosure can cover potential electrical probe points and display visible damage if the enclosure is tampered with. An HSM can enable and/or deny access to a key according to a security policy. For example, the security policy can specify that a particular key can only used and/or accessed when authorized account credentials are presented to the HSM. Accordingly, using an HSM can potentially increase a confidentiality and security of the information stored on the HSM and can potentially increase a performance of a system using the HSM.

Hardware security modules can be implemented using various different computer architectures. For example, an HSM can be implemented as a plug-in circuit card that interfaces to an input/output or peripheral interface (such as Peripheral Component Interconnect Express (PCIe)) of a computer and can include a connector for connecting to a backplane or other connector of the computer. As another example, an HSM can be implemented as a computer appliance that is connected over a computer network (a network-based HSM can also be referred to as a netHSM). As another example, an HSM can be implemented as a virtualized resource within a cloud-computing infrastructure (a cloud-based HSM can also be referred to as a cloudHSM). HSMs can have different storage capacities and/or acceleration capabilities. For example, a physical HSM can be divided into multiple logical HSMs, where each logical HSM can have different capabilities and can be accessed using different account credentials. A logical HSM can also be referred to as a partition or token of the physical HSM. Partitions of the HSM can be isolated from each other so that keys and data on one partition are not visible from a different partition. Partitions can share hardware and other resources or the partitions can use specific unshared hardware and resources. An HSM can use various storage technologies, such as random-access memory (RAM), non-volatile RAM, FLASH memory, a hard-disk drive, a solid-state drive, or other storage implementations. Having a diversity of different HSM architectures can potentially allow service providers to make trade-offs between cost, performance, and storage capacity of the HSM. However, the diversity of architectures can potentially complicate system design for interfacing to the HSM.

Standardized interfaces to the HSM can enable a service provider to interface to different HSMs with a single interface while masking underlying implementation details of the HSM. The Public Key Cryptography Standards (PKCS) are a class of public-key cryptography standards and PKCS #11 (also referred to as Cryptoki) is a specific platform-independent application programming interface (API) for interfacing to an HSM. Specifically, PKCS #11 defines data types, functions, and other components that are available to applications that implement the PKCS #11 standard. The object data type represents an item, such as a cryptographic key, that is stored on the HSM. When an object is created or found on an HSM by an application, the HSM can assign a handle to the object for a session of the application to use or access the object. A handle is an identifier or reference to a resource or object. For example, a handle can be an integer that is assigned by the HSM, an operating system, or other software when an object is created or first used. The handle for an object on the HSM is volatile because the handle for the object can change during the lifetime of the object. In contrast, a persistent attribute of an object, once initialized, does not change for the lifetime of the object. Additionally, a key handle can be different for the same key in different sessions. For the same session, the key handle can change when the session is re-established. For some functions performed by the HSM, the key handle may be the only way to reference the key when performing the function.

Applications that access the HSM can account for the volatility of key handles by making multiple requests to the HSM to perform an operation using a key that is stored on the HSM. For example, the application can query the HSM for the volatile key handle using a persistent attribute (e.g., the CKA_ID attribute or the CKA_LABEL attribute defined in the PKCS #11 standard) of the key as a reference for the key. The HSM can return the key handle and then the application can request that the HSM perform the operation using the key that is referenced by the key handle. The additional query can ensure that the correct key handle is used, but it adds latency to the operation and uses network bandwidth between the requestor and the HSM.

As disclosed herein, key handles can be stored in a data structure and the data structure can be updated when the key handle changes so that the additional query can potentially be eliminated for most operations performed by the HSM. In one example, a multi-threaded software routine (e.g., a software daemon) can be used to offload cryptographic functions for an intermediary server performing load-balancing, proxy, encryption, and decryption functionality for an application server. The multi-threaded software routine can use an external netHSM to generate and store keys and to perform operations using the keys. Each thread of the routine can establish its own session connecting to the external netHSM via the PKCS #11 protocol. Each thread corresponds to one client of the external netHSM server. Each key can be identified by a key handle and its corresponding session handle. A data structure can be used to maintain the key and session information for the threads of the routine. For example, the data structure can include two per-thread tables, such as a key table and session table. The key table can map a persistent attribute of the key, such as a key string identifier (e.g., CKA_ID) to the volatile key handle in the table. The key table can also include an index to a corresponding partition entry in the session table. The session table can map a more persistent partition label to the volatile session handle. The software routine can reference the keys in the external netHSM using an index of the key (referred to as the key index) in the key table. The key index is persistent during the execution lifetime of the routine and can be used to retrieve both the key handle from the key table and the session handle from the session table. The key string identifier stored in the key table and the partition label stored in the session table can be used to automatically recover the key handle when the session is re-created in order to ensure the correctness of the key handle in the key table even when the key handle changes.

The multi-threaded software routine can include the data structure, a self-recovery mechanism, and a sync-up mechanism. The data structure can be saved in non-volatile storage so that the contents of the data structure can be maintained even when the multi-threaded software routine is not executing (e.g., such as during a reboot). The key index of the data structure can be saved persistently by any modules using the keys to identify a volatile key handle (e.g., a PKCS #11 key handle) and to conduct any key operation (e.g., a PKCS #11 key operation) even with the volatile dynamics of the key handle and the session handle. The self-recovery mechanism can enable the key handle and the session handle to be updated within the data structure when stale key handles and/or stale session handles are detected. The sync-up mechanism can ensure that all clients connecting to one external netHSM device use the same key index pointing to the same key in the external netHSM device. An initialization sequence of the multi-threaded software routine can be executed when the multi-threaded software routine is restarted or rebooted. During the initialization sequence, the persistent key string identifier can be used to look up key handles across all partitions of the external netHSM for all threads. The initialization sequence can bootstrap rebuilding the key table and the session table. Once the table is reestablished, the key table index becomes persistent and can be used to refer to the actual key saved in the external netHSM device. Accordingly, the key handle and the session handle can be automatically recovered in the event of a session re-establishment due to network outages or reboots of the external netHSM device.

Example Architectures Using Hardware Security Modules

FIG. 1A is a block diagram of an example client-server architecture 100, including an intermediary server 110 and security hardware circuitry (e.g., a hardware security module 150), that can be used to perform a computing task that is distributed among different components of the client-server architecture 100. Specifically, FIG. 1A illustrates how network traffic between a client device 140 and an application server computer 120 can be forwarded by the intermediary server computer 110 and how cryptographic operations performed by the intermediary server computer 110 can be offloaded to the hardware security module 150. The client-server architecture 100 can include the intermediary server computer 110, the application server 120, communication network(s) 130, the client device 140, and the hardware security module 150. The client-server architecture 100 can be implemented using a client-server architecture as described in more detail with reference to FIG. 8, where the different components (110, 120, 130, 140, 150) of the client-server architecture can be implemented using a computing environment as described in more detail with reference to FIG. 9.

The client device 140 and the application server 120 can communicate via the communication network(s) 130 and the intermediary server computer 110. Specifically, requests from the client device 140 can be forwarded through the communication network(s) 130 and the intermediary server computer 110 to the application server 120 using the communication channel 160. The client device 140 can be a computing device capable of sending network traffic over a communications network (e.g., network 130). For example, the client device 140 can be a mobile computing device, a desktop computing device, a laptop computing device, a tablet computing device, a virtual machine executing on a cloud-based computing environment, and so forth. The client device 140 can execute an agent 142 (e.g., a browser or other software application) that requests a service provided by the application server 120. For example, the agent 142 can generate requests that are transmitted by the client device 140 using a connectionless communication protocol (e.g., UDP) or a connection-oriented communication protocol (e.g., TCP). The application server 120 can be a computing device capable of sending network traffic over a communications network (e.g., network 130) and processing requests by client devices (such as the client device 140). The application server 120 can include multiple hardware and/or software server resources (not shown), a virtual machine executing on a cloud-based computing environment, and so forth. The application server 120 can execute a server software application, such as an HTTP server application or a secure shell (SSH) server application, for example.

The traffic management logic 114 of the intermediary server computer 110 can perform various proxy and other services, such as load balancing, rate monitoring, caching, encryption/decryption, session management (including key generation), address translation, and/or access control, for example. For example, the intermediary server computer 110 can act as a proxy for the application server 120. A proxy is an agent that is situated in a path of communication between a client (e.g., the client device 140) and a server (e.g., the application server 120) that can intercept communications (e.g., network packets, frames, datagrams, and messages) between the client and the server. The intermediary server computer 110 can function as a virtual server that presents a network address of the proxy as the network address for the server 120. For example, the client device 140 can request a service of the application server 120 by sending a request that is destined for the application server 120 (e.g., using the network address of the virtual server as the destination address). The intermediary server computer 110 can intercept the request on behalf of the application server 120. The intermediary server computer 110 can process the request and perform various operations on behalf of the application server 120. The intermediary server computer 110 can forward the request to the application server 120 over the communication channel 160. Before forwarding, the proxy can modify the request from the client, such as by changing the destination address to be the network address of the application server 120. The application server 120 can respond to the request from the client device 140 via the intermediary server computer 110. Specifically, the intermediary server computer 110 can intercept the response from the application server 120 and modify the response, such as by changing the source address of the response to be the network address of the virtual server. The response can then be forwarded to the client device 140.

The traffic management logic 114 of the intermediary server computer 110 can manage sessions (e.g., a communication session with the client 140) and encryption/decryption tasks for the application server 120. Session management can include setting up a session, analyzing activity of the session, maintaining session timers, tearing down a session, and generating information that is used during the session, such as assigning a session identifier and generating cryptographic keys for encryption and decryption. For example, the intermediary server computer 110 can participate in a TLS handshake with the client device 140 to generate an SSL or TLS session over a TCP connection between the client device 140 and the intermediary server computer 110. During a TLS handshake, a client and server (or intermediary acting on behalf of a server) exchange information for creating the symmetric key. As one example, the intermediary 110, acting on behalf of the server 120, can perform various cryptographic and communication operations during the TLS handshake, such as: receiving a client random number; generating a server random number and sending the server random number along with the server's SSL certificate to the client 140; receiving a premaster secret from the client 140 that is encrypted using the public key of the server 120; decrypting the premaster secret using a private key of the server 120; generating the symmetric key for the TLS session using the client random number, the server random number, and the premaster secret; generating a hash code and/or message authentication code using the handshake messages; encrypting the hash code and/or message authentication code using the private key of the server 120; sending the encrypted hash code and/or message authentication code to the client 140; receiving an encrypted hash code and/or message authentication code from the client 140 that is encrypted using the public key of the server 120; and verifying that the decrypted hash code and/or message authentication code match the generated hash code and/or message authentication code. When the session is created after the TLS handshake, information about the session can be stored in a data structure (not shown) or in the HSM management data structure(s) 116. For example, the session can have a session identifier, a client reference (e.g., a client IP address), a key identifier, a key index, and so forth. As described in more detail below with reference to FIG. 2, the key index can identify an entry in the HSM management data structure(s) 116 where information about the key is stored.

The traffic management logic 114 of the intermediary server computer 110 can manage encryption/decryption tasks for the application server 120. For example, after a TLS session is created, the client device 140 can communicate with the application server 120 using encrypted communications that transit the network 130. The traffic management logic 114 can decrypt encrypted communications from the client 140 and send the unencrypted communications to the application server 120. The traffic management logic 114 can encrypt unencrypted communications from the application server 120 and send the encrypted communications to the client 140. Specifically, the traffic management logic 114 can identify the session associated with the communication and can use the key generated for the session to encrypt/decrypt the communication before it is forwarded to the client 140 or the application server 120.

The traffic management logic 114 can offload cryptographic operations by sending requests to the cryptography offload logic 112. The cryptography offload logic 112 can be a multi-threaded real-time software routine that interfaces to the HSM 150. For example, the cryptography offload logic 112 can be a software daemon executed by a processor of the intermediary server computer 110. A daemon is a software routine that runs as a background process. A real-time software routine is a routine that processes information with a time constraint. Real-time systems can schedule tasks (e.g., threads) based on time constraints and can preempt or interrupt tasks based on a priority of completing the task. Each thread of the cryptography offload logic 112 can communicate with the HSM 150 using a different session (also referred to as an HSM session to distinguish it from the TLS session). A session can be initiated by a thread by requesting that a session be opened on a particular token of the HSM 150. The HSM 150 can return a session handle for the session and the session handle can be used when requesting cryptographic operations be performed by the HSM 150. The session handle and other information about the session can be stored in the HSM data structure(s) 116. After a session for the thread is opened, the thread can be used to manage the performance of a cryptographic operation. The multiple threads can be used to perform multiple cryptographic operations concurrently on the HSM 150. For example, the threads can be a pool of resources used by the cryptography offload logic 112. When the traffic management logic 114 requests that a new cryptographic operation be offloaded, the cryptography offload logic 112 can select a thread to oversee the operation. Specifically, the cryptography offload logic 112 can interface to the HSM 150 over the communication channel 162 using a communication protocol such as PKCS #11. A thread of the cryptography offload logic 112 can request the HSM 150 to perform operations such as: generate a key (e.g., a symmetric key), generate a public/private key pair, encrypt a private key, decrypt an encrypted key, encrypt data using a key, decrypt data using a key, generate a random or pseudo-random number, and so forth. The thread of the cryptography offload logic 112 can receive the results from the HSM 150 and pass the results back to the traffic management logic 114. In this manner, the cryptography offload logic 112 can buffer requests for the HSM 150 resources and wait for and gather results from the HSM 150 while enabling the traffic management logic 114 to process network traffic transiting the intermediary server computer 110.

The HSM 150 can store keys 152A-N in volatile and/or non-volatile storage elements of the HSM 150. The keys 152A-N can be generated by the HSM 150 and/or requested to be stored on the HSM 150. The keys 152A-N can potentially be kept more secure by storing the keys 152A-N on the HSM 150. Each of the keys 152A-N can have persistent attributes and volatile attributes. As used herein, a persistent attribute of a key is an attribute that, once initialized, does not change for the lifetime of the key and/or for a lifetime of the thread that uses the key. As used herein, a volatile attribute of a key is an attribute that is created by the HSM 150 and can change during the lifetime of the key without notifying the thread(s) that use the key. Persistent attributes of the key can include a key string identifier (e.g., CKA_ID) and a value of the key. Volatile attributes of the key can include the key handle(s). A given key handle is valid as an identifier of the key for a given session, and each session associated with a single thread of the cryptography offload logic 112. A given key can have multiple key handles, where a different key handle can be used by each session that accesses the key.

The HSM 150 can perform cryptographic and other operations using the keys 152A-N. Specifically, the HSM 150 can receive requests associated with an active HSM session. The requests can include requests to retrieve the key handle, requests to initialize or update a persistent attribute, and requests to perform a cryptographic operation. As one example, the key handle can be returned in response to a request for the handle using a persistent attribute (e.g., the key string identifier) as a reference. As another example, the key string identifier can be updated in response to a request to update the identifier using the key handle as a reference. The key string identifier can be updated as part of an initialization sequence of the key to add entropy to the key string identifier (e.g., make the key string identifier more unique). For example, the key can be created with a simple name such as "key1." After the key is generated, a modulus of the key (e.g., the last 16 characters of the key) or a value generated using the key can be combined with (e.g., appended to) the key string identifier to generate a more unique name such as "key19876beef1001feed." Cryptographic operations can be requested using the key handle as a reference. The key handle and the corresponding key string identifier and session handles can be determined using the entries of the HSM management data structure(s) 116.

It should be appreciated by one of ordinary skill in the art having the benefit of the present disclosure, that the communications channels 160 and 162 have been simplified for the ease of illustration. The communications channels 160 and 162 can be implemented using multiple networks and/or networking devices to interconnect the components of the client-server architecture 100.

In sum, the intermediary server computer 110 can control network traffic between the client device 140 and the application server computer 120. Encrypted network traffic can be communicated over the communication network(s) 130 (such as the Internet or another public network) between the client device 140 and the intermediary server computer 110. The intermediary server computer 110 can offload computationally expensive cryptographic operations to the HSM 150. The HSM management data structure(s) 116 can be used to store the volatile key handles so that the intermediary server computer 110 can request that the cryptographic operations be performed using the keys as referenced by the key handles. By storing the key handles at the intermediary server computer 110, additional queries for the key handles can be reduced and/or eliminated so that processing the network traffic is potentially more efficient (e.g., processing time and energy consumption can be reduced). Additionally, the network traffic between the intermediary server computer 110 and the application server computer 120 can be unencrypted so that the application server computer 120 is does not have to perform the additional tasks of encryption and decryption.

Figure 1B:
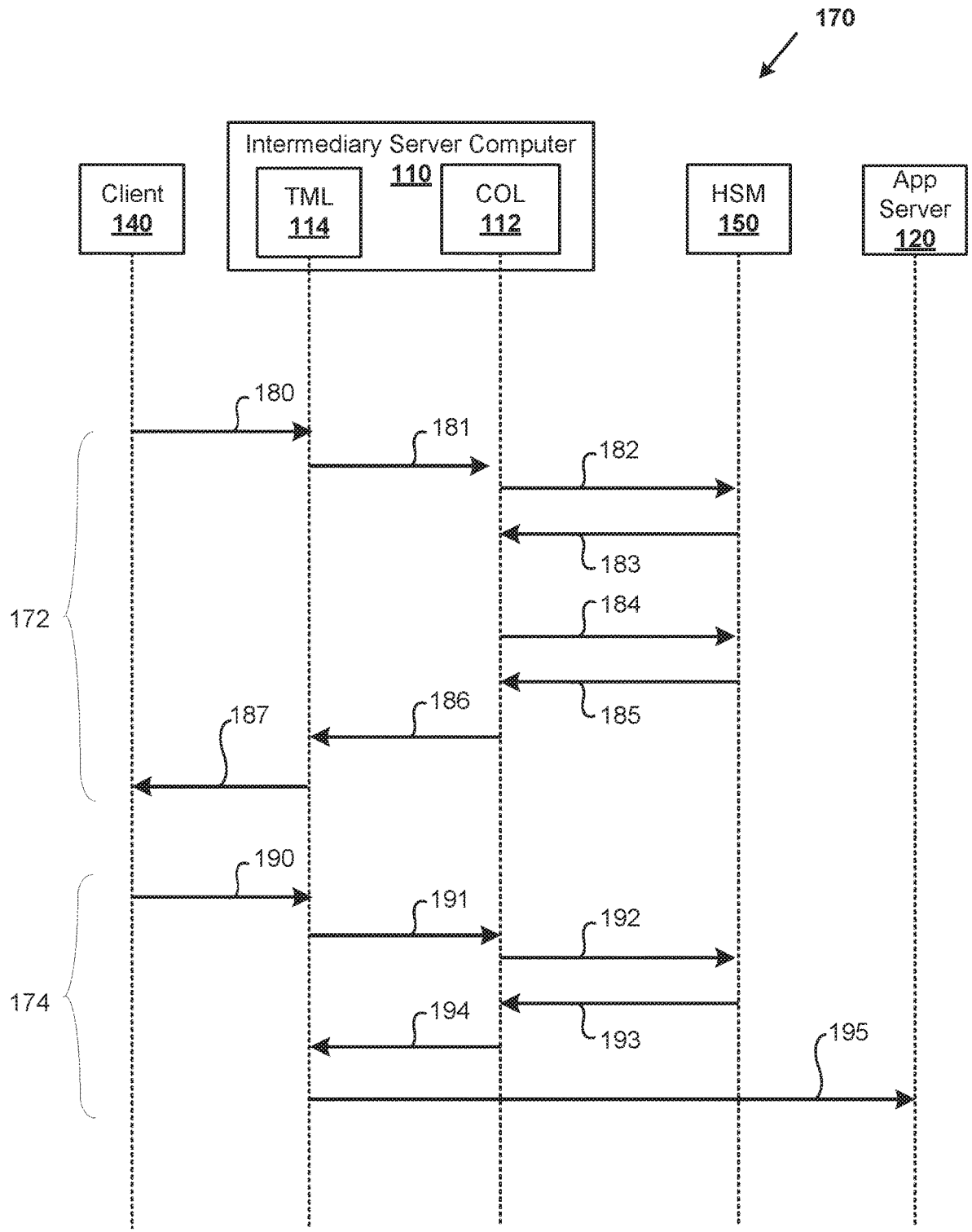
FIG. 1B is a timing diagram illustrating example transactions occurring on the client-server architecture including an intermediary server computer and security hardware circuitry, such as a hardware security module.

The interaction of the intermediary server computer 110, the HSM 150, the client device 140, and the application server computer 120 are further illustrated with the example transactions depicted in the timing diagram 170 of FIG. 1B. Specifically, the timing diagram 170 shows an initial exchange 172 and the subsequent exchange 174 of communications between the various components of the client-server architecture 100. For example, the initial exchange 172 can be used to generate a key (such as during a TLS handshake between the client 140 and the intermediary server 110 acting on behalf of the application server 120) and the subsequent exchange 174 can be used to transmit information from the client 140 to the application server 120. Accordingly, the intermediary server computer 110 can offload encryption and decryption functionality from the application server 120. Communications between the client 140 and the intermediary server computer 110 can be encrypted, and communications between the intermediary server computer 110 and the application server 120 can be unencrypted.

The exchange 172 begins when the client 140 requests to initiate an encrypted communication session with the application server 120. The request 180 to initiate the session is intercepted by the intermediary server computer 110 on behalf of the application server 120. Specifically, the traffic management logic 114 can process the request 180 and can partition the request 180 into subtasks. For example, the subtasks can include cryptographic operations (e.g., key generation, encryption, decryption) to be performed by the HSM 150. Specifically, the traffic management logic 114 can send a request 181 to the cryptography offload logic 112 to generate a cryptographic key. The key can be identified using a persistent attribute of the key, such as a name that includes a representation (e.g., an IP address or a name) of the client and/or the service requested by the client. The cryptography offload logic 112 can service the request 181 by offloading cryptography operations to the HSM 150. Specifically, the cryptography offload logic 112 can have the key generated and stored at the HSM 150 through a series of exchanges. For example, a request 182 can be sent to the HSM 150 querying the HSM 150 for a volatile attribute of the key. The query 182 can identify the key using the persistent attribute of the key. The volatile attribute of the key can be returned by the HSM 150 in the response 183 to the cryptography offload logic 112. The volatile attribute of the key can be stored in a data structure of the cryptography offload logic 112. By storing the volatile attribute of the key external to the HSM 150, subsequent requests to perform cryptographic operations on the HSM 150 can be made without querying the HSM 150 for the volatile attribute of the key. The request 184 can be sent to the HSM 150 requesting that the key be generated, where the key is identified by the volatile attribute of the key. The request 184 can include various information for creating the key, such as one or more random numbers. The response 185 can indicate a status (e.g., success or failure) of the operation and/or additional information (such as a result of the cryptographic operation, a public key, and/or a modulus of a public key). The result(s) from the response 185 can be communicated to the traffic management logic 114 in the response 186. A response 187 can be generated and sent to the client 140.

The subsequent exchange 174 can use the same cryptographic key that was used in the initial exchange 172. For example, the cryptographic key generated in the exchange 172 can be used to encrypt information that is transmitted from the client 140 in the message 190. The message 190 can be intercepted by the intermediary server computer 110 on behalf of the application server 120. The message 190 can be processed by the traffic management logic 114 which can determine that the message was encrypted with the cryptographic key. The traffic management logic 114 can send a request 191 to the cryptography offload logic 112 to decrypt the received encrypted information using the key stored in the HSM 150. The request 191 can identify the key using the persistent attribute of the key (e.g., the name of the key associated with the client 140). The cryptography offload logic 112 can use the persistent attribute of the key to find the volatile attribute of the key that is stored in the data structure. Using the stored volatile attribute can eliminate a query to the HSM 150. Eliminating the query can decrease processing time and conserve bandwidth resources between the intermediary server computer 110 and HSM 150. The cryptography offload logic 112 can send a request 192 to the HSM 150 to decrypt the information from the message 190 using the key. The request 192 can identify the key by the volatile attribute of the key. The cryptography offload logic 112 can perform the decryption operation on the HSM 150 so that the key is not accessible outside of the HSM 150. By performing the decryption operation on the HSM 150, a security of the key can potentially be increased. The response 193 can include the status of the decryption operation and the unencrypted information. The cryptography offload logic 112 can notify 194 the traffic management logic 114 that the message 190 has been decrypted and in response, the traffic management logic 114 can send the unencrypted message to the application server 120 using the message 195.

Figure 2:
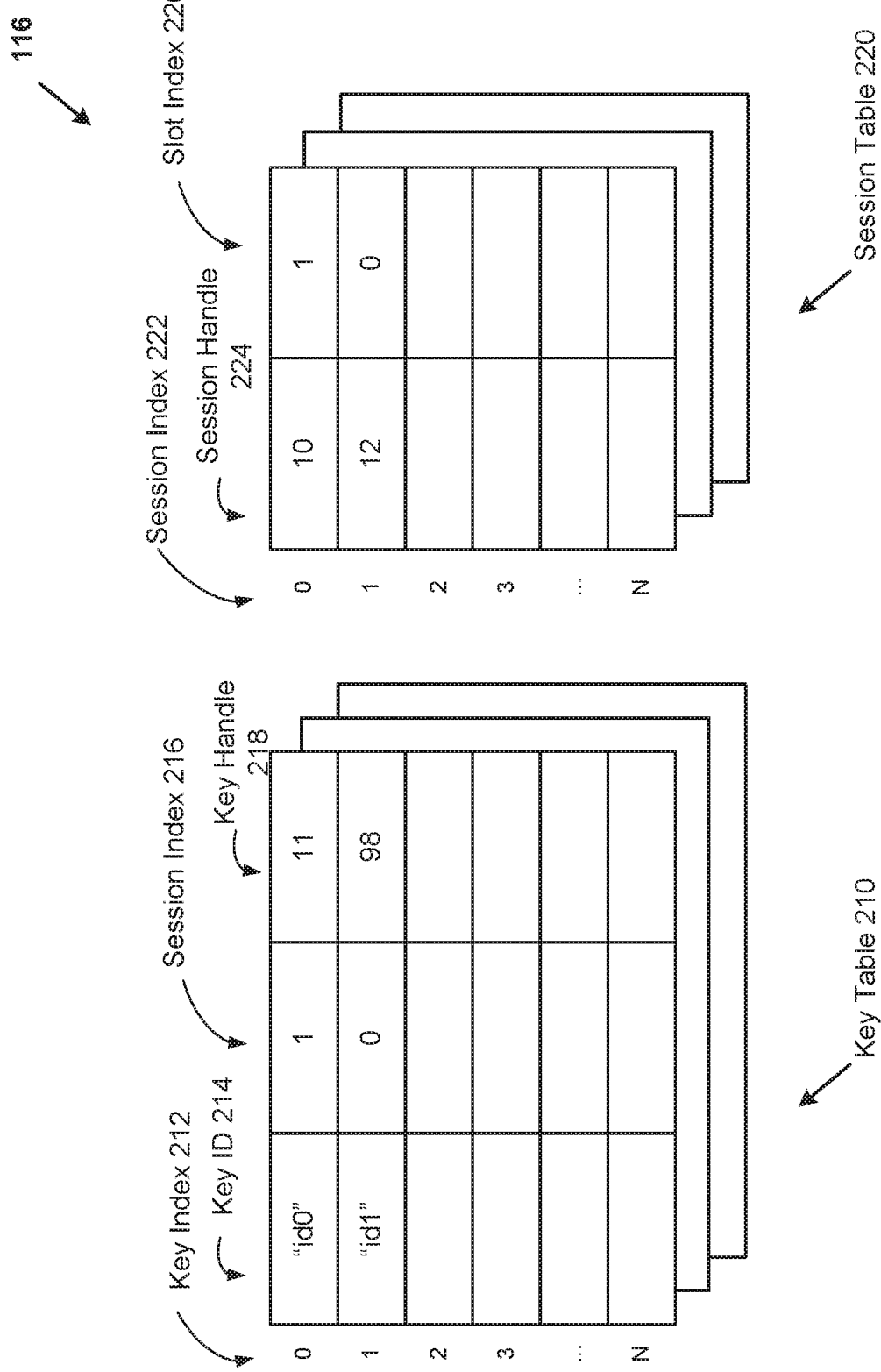
FIG. 2 is a block diagram of an example data structure used for accessing keys of security hardware circuitry, such as a hardware security module.

FIG. 2 is a block diagram of an example data structure 116 used for accessing keys of security hardware circuitry (such as the keys 152A-N of HSM 150 of FIG. 1A). A data structure is an organization for data that is stored in a computer-readable memory and that can be accessed by computer logic (e.g., software, hardware, and/or combinations thereof) during execution of the computer logic.

The data structure 116 can be organized as one or more tables, where a row of a table is referred to as an entry and columns of the table can be used to store different values within the respective entries. As illustrated, the data structure 116 includes two tables per thread, a key table 210 and a session table 220, where a thread can be a thread of the cryptography offload logic 112. Entries of the key table 210 can be identified using the key index values 212 which are labeled 0-N; entries of the session table 220 can be identified using the session index values 222 which are also labeled 0-N. For example, each of the entries of the key table 210 can correspond to a different TLS session associated with a network flow between a given client and the application server. Each TLS session can be assigned a different symmetric key for encrypting traffic sent over a public network and decrypting the traffic at its destination (or at an intermediary acting on behalf of the destination node). The thread of the cryptography offload logic 112 can use the key index 212 to represent the key that is to be used for an operation. Each of the entries of the key table 210 can include multiple values representing different attributes of a given key and information for accessing and/or using the key on the HSM. For example, the key identifier column 214 can be used to identify the persistent key string identifier for the given key. The key string identifier can be used to query the HSM for the volatile key handle. The key handle column 218 can be used to store the volatile key handle.

Each of the keys can be stored on different tokens or partitions of the HSM and the cryptography offload logic 112 can establish a different HSM session with each of the tokens. For example, establishing a session with the token of the HSM can include providing account credentials for the token. The account credentials can be assigned to a process, a thread, a client, or an application server, for example. The token can assign a session handle for each HSM session to identify the different sessions. Each thread can use a different HSM session for communicating with a token of the HSM. The HSM sessions can be tracked in the session table 220. For example, each of the entries of the session table 220 can correspond to a different HSM session that is established between the intermediary server computer and the HSM. Each HSM session can be assigned a session index that refers to its entry in the session table 220. The session handle column 224 can be used to store the session handle for the HSM session. The slot index column 226 can be used to store the token where the HSM session is established. A slot can be a logical reader that potentially contains a token. The session index column 216 of the key table 210 can store the session index corresponding to the HSM session that is used to access and use the key.

One thread can be used to generate a key and the other threads can use the key. Each of the threads accesses the key using a different session and the key handle for the key can be different in the each of the different sessions. When a first thread is used to generate a first key, the first thread can populate the entries for the first thread in the key table 210 and the session table 220. The first thread can request that the other threads update their entries for the first key so that the other threads will be able to use the first key. Each of the other threads can use a persistent attribute, such as the key string identifier, to query the HSM for the key handle that identifies the key using a session associated with the respective thread. Each of the other threads can synchronize or update their corresponding entries in the key table 210 and the session table 220.

As a specific example, a request to generate a key with a key string identifier of "id0" can be received by a thread of the cryptography offload logic 112. The thread can select a token of the HSM to store the key. For example, the keys can be relatively evenly distributed across different tokens of the HSM. The thread can send a request to generate the key to the HSM using the session associated with the thread and the selected token. The request can include the operation to perform (e.g., create a symmetric key) and a persistent attribute of the key (e.g., the key string identifier). The HSM can create key and return a response to the thread. For example, the response can include the key handle that is used to identify the key within the token of the HSM. The data structure 116 can be updated with this information. Specifically, an entry or entries within the key table 210 and/or the session table 220 can be populated with the information about the key. For example, entry 0 of the key table 210 identifies that the key with the key string identifier of "id0" and key handle "11" uses the session associated with the session index "1" to access the HSM. The entry 1 of the session table 220 identifies that the session handle "12" is used for this thread to communicate with token/slot "0." As another example, entry 1 of the key table 210 identifies that the key with the key string identifier of "id1" and key handle "98" uses the session associated with the session index "0" to access the HSM. The entry 0 of the session table 220 identifies that the session handle "10" is used for this thread to communicate with token/slot "1." The entries can be generated and/or updated when keys are generated, in response to another thread generating a key (also referred to as synchronizing with the other threads), in response to an initialization sequence being executed (such as when sessions are being reestablished after a network outage between the intermediary server computer and the HSM), and/or in response to the error being detected when accessing the key with the current key handle.

It should be appreciated by one of ordinary skill in the art having the benefit of the present disclosure, that while the data structure 116 is illustrated as having two tables, different organizations are possible. For example, the information contained in the data structure 116 can be organized as a single table or more than two tables. As another example, additional or less information can be stored in the data structure 116.

Figure 3:
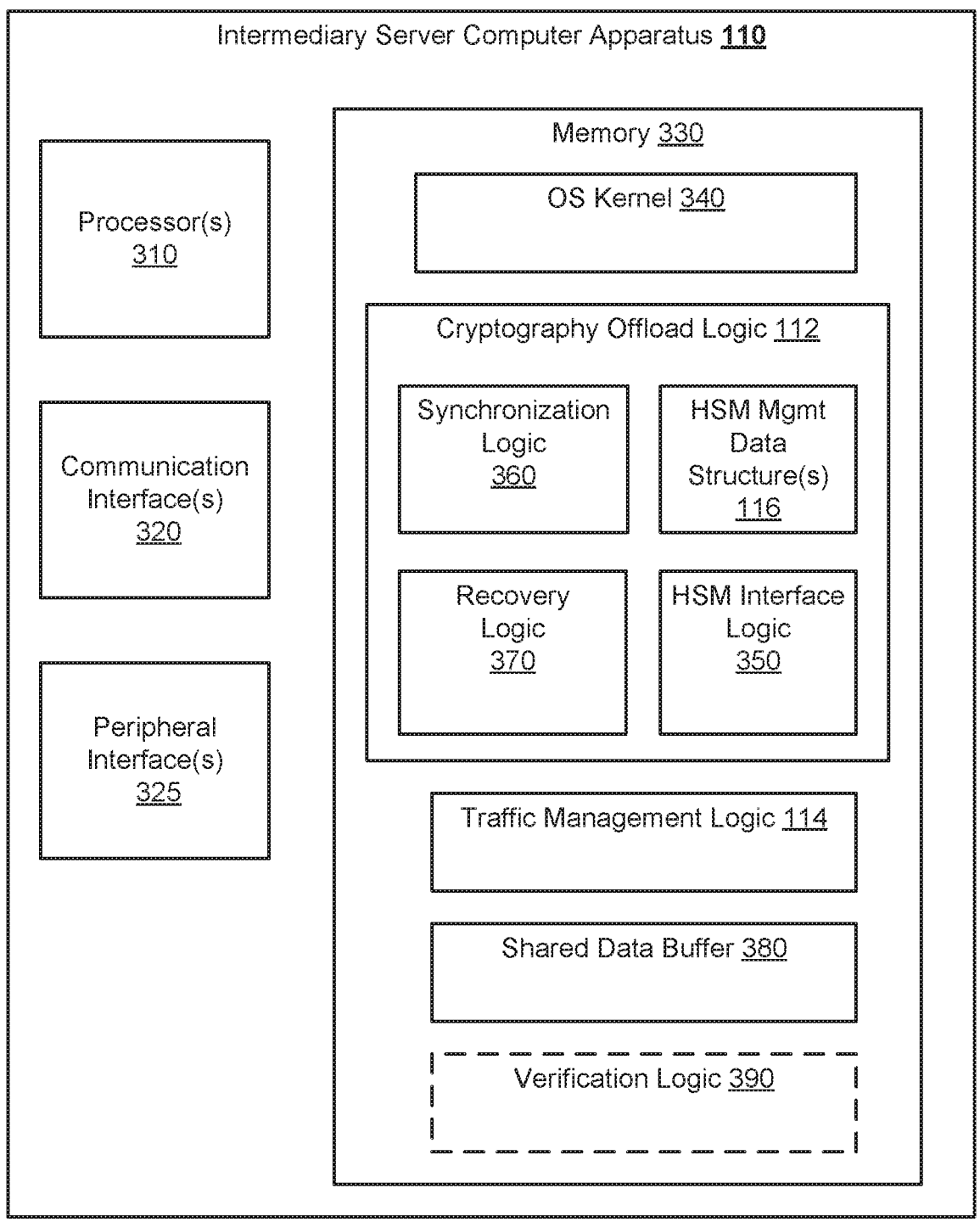
FIG. 3 is a block diagram of an example intermediary server computer apparatus including a data structure and logic for accessing security hardware circuitry, such as a hardware security module.

FIG. 3 is a block diagram of an example intermediary server computer apparatus 110 including an HSM management data structure 116 and cryptography offload logic 112 for accessing security hardware security, such as an HSM (not shown in FIG. 3). For example, the intermediary server computer apparatus 110 can be a load balancer, an application delivery controller, a network traffic management system, or another component configured to be in a communication path between a client (e.g., client 140 of FIG. 1A) and an application server (e.g., application server 120 of FIG. 1A) of a client-server architecture. The intermediary server computer apparatus 110 can be implemented using a computing environment as described in more detail with reference to FIG. 9.

The intermediary server computer apparatus 110 can include one or more processor(s) 310, one or more communication interface(s) 320, one or more peripheral interface(s) 325, and memory 330. The processor 310, communication interface 320, peripheral interface 325, and the memory 330 can be coupled together with an interconnect (not shown) so that the components of the computer apparatus 110 can communicate with each other using the interconnect. The communication interface 320 can be used to send and receive communications (e.g., network packets) with other computing devices, such as a client, an application server, and an HSM. The processor 310 can be used to execute computer-executable instructions that are stored in the memory 330 and/or storage resources (not shown). The computer-executable instructions can be organized into software routines (also referred to as modules or components) comprising executable code to perform various computing tasks. It should be noted that while FIG. 3 illustrates one organization of routines, other organizations are possible. For example, the illustrated routines can be sub-divided into smaller routines and/or combined into larger routines. The memory 330 can also include structured and/or unstructured data (e.g., HSM management data structure(s) 116) that is used by the software routines to perform the computing tasks.

The operating system (OS) kernel 340 can include different software routines for managing different aspects of the execution of programs and for interfacing with the hardware of the intermediary server computer apparatus 110. For example, the OS kernel 340 can manage the loading and removal of software applications and other routines into the memory 330 of the computer apparatus 110; the OS kernel 340 can manage storage resources of the computer apparatus 110; the OS kernel 340 can manage processes and/or threads executing on the processor 310; the OS kernel 340 can manage power states of the computer apparatus 110; the OS kernel 340 can provide an interface for applications and other routines to send and receive communications (e.g., network packets) using the communications interface 320; and the OS kernel 340 can enable inter-process communication between different routines executing on the computer apparatus 110.

The traffic management logic 114 can include different software routines for controlling the network traffic transiting the intermediary server computer 110 by performing various proxy and other services, such as load balancing, rate monitoring, caching, encryption/decryption, TLS session management (including key generation), address translation, traffic forwarding, traffic buffering, and/or access control, for example. For example, the traffic management logic 114 can buffer network traffic (such as in the shared data buffer 380) that is to be encrypted before the traffic is sent over a public network. As another example, the traffic management logic 114 can buffer encrypted network traffic (such as in the shared data buffer 380) that is to be decrypted before the traffic is sent to the application server. The traffic management logic 114 can identify cryptographic keys associated with the buffered network traffic and can request that the cryptography offload logic 112 perform cryptographic operations on the buffered network traffic. For example, the traffic management logic 114 can send a request to the cryptography offload logic 112, where the request includes an operation to perform (e.g., encrypt or decrypt), a key to use (which can be identified using a key string identifier or a key index), and reference to data (e.g., a pointer to the buffered network traffic in the shared data buffer 380). The traffic management logic 114 can receive responses from the cryptography offload logic 112 indicating that the operation is complete (e.g., the buffered data has been encrypted or decrypted) so that the encrypted/decrypted traffic can be forwarded to its destination.

The cryptography offload logic 112 can include different software routines for interfacing to the traffic management logic 114 and the HSM, and for offloading cryptography operations from the intermediary server computer 110 to the HSM. For example, the cryptography offload logic 112 can include a real-time multi-threaded software routine for interfacing to the HSM. The different threads can execute in parallel to concurrently service multiple requests from the traffic management logic 114 and to present multiple concurrent requests to the HSM. The cryptography offload logic 112 can include software routines including HSM interface logic 350, synchronization logic 360, and recovery logic 370. The cryptography offload logic 112 can include unstructured and structured data, such as the HSM management data structure(s) 116. The HSM interface logic 350 can format requests and parse responses from the HSM. A standard protocol such as the public key cryptography standard (e.g., PKCS #11) can be used to mask specific architectural implementations of the HSM from the cryptography offload logic 112. Specifically, libraries of the standard can be used to interface with the specific hardware implementation of the HSM while presenting a higher-level standardized interface to the cryptography offload logic 112. The synchronization logic 360 can be used to update information about the keys for the parallel threads executing in the cryptography offload logic 112. For example, when a new key is generated using one thread, the synchronization logic 360 can initiate queries for the other threads so that the information about the key can be updated and all of the threads. The key handles for a given key can be different for the different threads and so synchronization can be used to determine the different key handles and update the corresponding entries of the HSM management data structure(s) 116. As another example, when a stale key handle is detected (such as when an error code is received for response using the original key handle), the synchronization logic 360 can initiate choir areas for the threads to determine the new key handles for each of the threads. The recovery logic 370 can be used to update information about the keys for the parallel threads following an interruption in the connection to the HSM. For example, after an interruption the HSM sessions can be reestablished and the key handles associated with each of the HSM sessions can be updated. The cryptography offload logic 112 can communicate with the traffic management logic 114 using shared memory and/or other enter process communications. For example, the data to be encrypted or decrypted by the cryptography offload logic 112 can be passed by the traffic management logic 114 using the shared data buffer memory 380. Similarly, the encrypted and decrypted data from the cryptography offload logic 112 can be passed to the traffic management logic 114 using the shared data buffer memory 380.

The optional verification logic 390 can include different software routines for testing that an HSM and its associated software libraries are interoperable with the intermediary server computer apparatus 110. As described in more detail with reference to FIGS. 6 and 7, the verification logic 390 can perform tests as part of a certification process for an HSM.

Example Methods Using Hardware Security Modules

Figure 4:
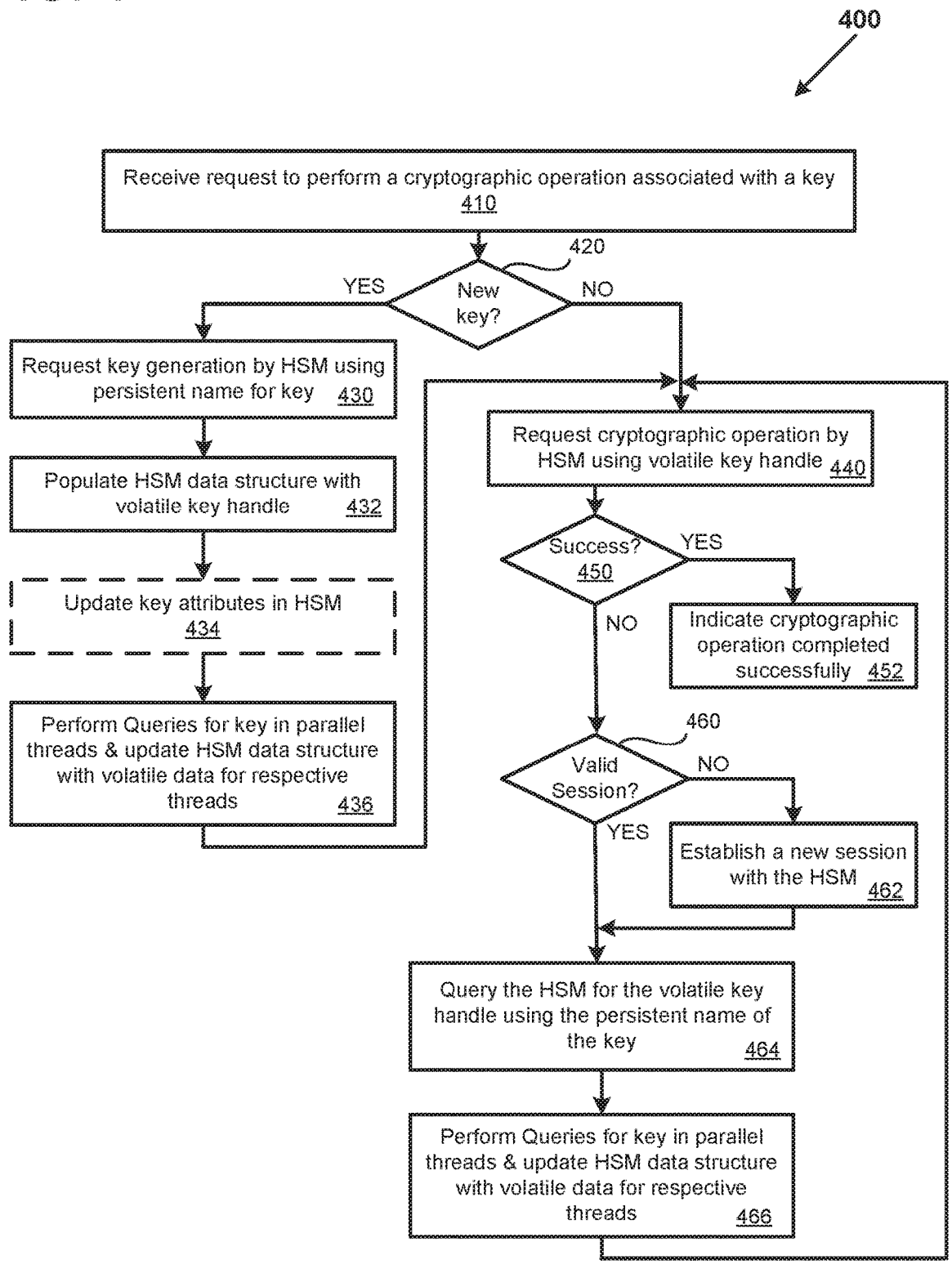
FIG. 4 is a flowchart of an example method of servicing a request to perform a cryptographic operation.

FIG. 4 is a flowchart of an example method 400 of servicing a request to perform a cryptographic operation. For example, the method 400 can be implemented by a thread executing on the intermediary server computer 110, such as described above in reference to FIGS. 1A, 1B, 2, and 3. For example, computer-executable instructions for carrying out the method 400 can be stored in a computer-readable memory of the intermediary server computer, and the instructions can be executed by a processor of the intermediary server computer to perform the method 400.

At 410, a request to perform a cryptographic operation can be received. The cryptographic operation can be associated with a key. For example, the cryptographic operation can be to generate a new key to be used for a TLS handshake, such as when a new client requests to establish a TLS session with an application server (or an intermediary server acting on the application server's behalf). Another cryptographic operation can be to encrypt data, such as data from an application server that is to be encrypted and transmitted to a client. Another cryptographic operation can be to decrypt data, such as encrypted data from a client that is to be transmitted on encrypted to the application server. The key can be a symmetric key that is agreed upon between the application server and the client during the TLS handshake, for example. The key can be identified using a persistent attribute of the key, such as a key string identifier.

At 420, it can be determined whether the key associated with the cryptographic operation is a new key or an existing key. If the key is a new key (e.g., a TLS session has not yet been opened), the method 400 can continue at 430. If the key is an existing key (e.g., a TLS session that uses the key is open), the method 400 can continue at 440. The determination of whether the key is a new key or an existing key can be performed by comparing and identifier of the key to identifiers of existing keys.

At 430, a request to generate the key can be sent to an HSM using a persistent name for the key. For example, the request can be sent to the HSM using a standardized protocol, such as PKCS #11. The HSM can generate the key and respond with a volatile key handle.

At 432, an HSM data structure (e.g. such as the HSM data structure 116 of FIGS. 1A, 1B, 2, and 3) can be populated with the volatile key handle. Specifically, the HSM data structure for a given thread can be updated with the volatile key handle. The HSM data structure can also be populated with additional persistent and/or volatile key attributes.

At 434, additional key attributes can be optionally updated on the HSM. For example, the request at 410 may initially use an identifier for the key that has a value that is the same or similar to identifiers for keys from other requests. The initial key identifier can be modified to make the updated key identifier more likely to be unique. As one example, a portion of the key (e.g., the key modulus sixteen) can be concatenated to the end of the initial key identifier to potentially create a more unique identifier.

At 436, queries can be performed for the key using parallel threads. The queries are performed by the parallel threads because the volatile key handle can be different for the different threads. The HSM data structure can be updated for the respective threads with the volatile key handle. The method 400 can continue at 440.

At 440, a cryptographic operation can be requested to be performed by the HSM using the volatile key handle of the key. The request can include a pointer or other reference to data that is to be used as input for the cryptographic operation. The HSM can attempt to perform the cryptographic operation and can indicate whether the operation was successful by returning a status field indicating the success or failure of the operation.

At 450, it can be determined whether the cryptographic operation was performed successfully by the HSM. For example, an error code in the status field the response can indicate that an error occurred. The error may occur because the key handle or the session handle use for the request are stale (e.g., no longer valid). If the cryptographic operation was successful, the method 400 can indicate (452) that the cryptographic operation completed successfully. Specifically, the method 400 can respond to the requester from 410 that the operation was successful. If the cryptographic operation was not successful, the method can continue at 460.

At 460, it can be determined whether the session with the HSM is still valid. For example, an interruption in communications between the HSM and the HSM client (e.g., the intermediary server) can invalidate the session. An invalid session can be determined by detecting a timeout with the HSM and/or by receiving an error code that indicates an invalid session. If the session is invalid, a new session can be established (462) with the HSM. The method 400 can continue at 464.

At 464, a valid session is active but the volatile key handle may be stale. The HSM can be queried for the volatile key handle using the persistent name of the key. The HSM can return the volatile key handle and HSM data structure can be updated with the new volatile key handle. When a stale key handle is encountered for one thread, the key handles are likely to be stale for the other threads as well. At 466, the parallel threads can perform queries for the key to obtain the key handle for the key. The HSM data structure can be updated with the volatile data for the respective threads. The method 400 can continue at 440 until the requested cryptographic operation is completed successfully.

Figure 5:
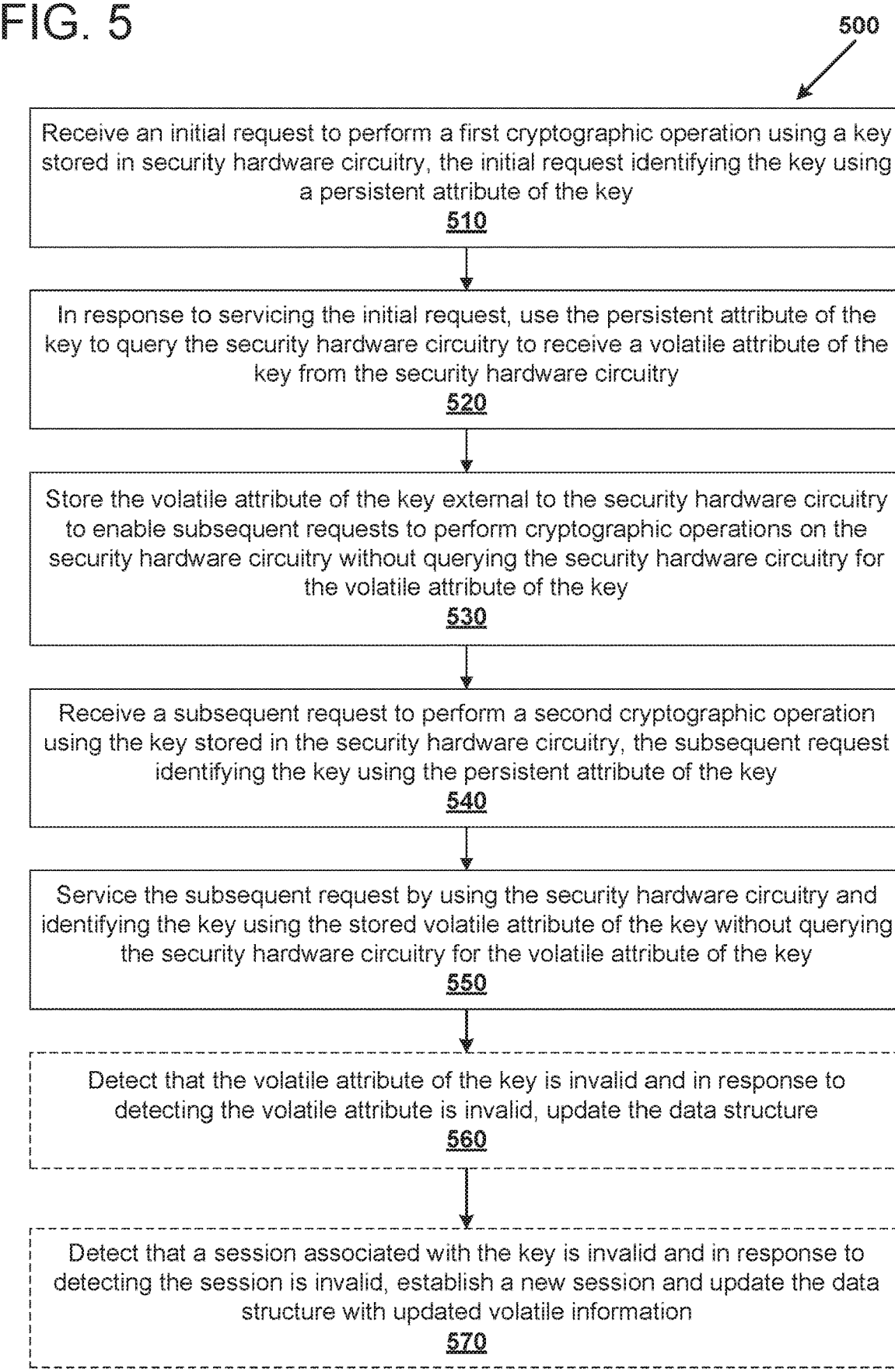
FIG. 5 is a flowchart of an example method for accessing a key stored in security hardware circuitry, such as a hardware security module.

FIG. 5 is a flowchart of an example secure communications method 500 using security hardware circuitry (e.g., a hardware security module). For example, the method 500 can be implemented by a thread executing on the intermediary server computer 110, such as described above in reference to FIGS. 1A, 1B, and 2-4. For example, computer-executable instructions for carrying out the method 500 can be stored in a computer-readable memory of the intermediary server computer, and the instructions can be executed by a processor of the intermediary server computer to perform the method 500.

At 510, an initial request can be received. The initial request can be requesting that a first cryptographic operation be performed using a key stored in security hardware circuitry. The initial request can identify the key using a persistent attribute of the key, such as a key string identifier. As one example, the initial request can be from traffic management logic and sent to a first thread of the cryptography offload logic. A persistent attribute of the key is an attribute that, once initialized, does not change for the lifetime of the key and/or for a lifetime of a thread that uses the key.

At 520, in response to servicing the initial request, the persistent attribute of the key can be used to query the security hardware circuitry to receive a volatile attribute of the key from the security hardware circuitry. As one example, the security hardware circuitry can be queried from the first thread of the cryptography offload logic using a session associated with the first thread and the security hardware circuitry. The volatile attribute of the key can be a key handle that is used by the security hardware circuitry to reference the key when performing cryptographic operations. A volatile attribute of the key is an attribute that is created by the security hardware circuitry and can change during the lifetime of the key without notifying the thread(s) that use the key.

At 530, the volatile attribute of the key can be stored external to the security hardware circuitry to enable subsequent requests to perform cryptographic operations on the security hardware circuitry without querying the security hardware circuitry for the volatile attribute of the key. As one example, the volatile attribute of the key can be stored in a data structure, such as the HSM management data structure 116 of FIGS. 1A, 2, and 3. The volatile attribute can be valid for the first thread, but the other threads may access the key using different values for the volatile attribute. Accordingly, the other threads can be synchronized with the first thread by performing queries from the different threads to receive respective volatile attributes corresponding to each of the threads. Specifically, in response to the initial thread receiving the volatile attribute of the key, a plurality of queries of the hardware security module can be performed for the remaining plurality of threads of execution to obtain a respective volatile attribute of the key for each thread of the remaining plurality of threads of execution. The respective volatile attributes of the key for the remaining plurality of threads of execution can be stored in the data structure.

At 540, a subsequent request can be received. The subsequent request can be to perform a second cryptographic operation using the key stored in the security hardware circuitry. The subsequent request can identify the key using the persistent attribute of the key. As one example, the subsequent request can be from the traffic management logic and sent to a second thread of the cryptography offload logic. The second thread can be the same or different as the first thread.

At 550, the subsequent request can be serviced by using the security hardware circuitry and identifying the key using the stored volatile attribute of the key without querying the security hardware circuitry for the volatile attribute of the key. A processing speed of the second cryptographic operation can potentially be increased by omitting the query of the security hardware circuitry.

At 560, it can optionally be detected that the volatile attribute of the key is invalid. In response to detecting the volatile attribute is invalid, the data structure can be updated. Specifically, in response to detecting that the volatile attribute of the key is invalid, a new query of the security hardware circuitry can be performed to receive a new volatile attribute of the key. The new query can identify the key using the persistent attribute of the key. The query can return the new volatile attribute of the key and the new volatile attribute of the key can be stored in the data structure.

At 570, it can optionally be detected that a session associated with the key is invalid. In response to detecting the session is invalid, a new session can be established, and the data structure can be updated with volatile information that is valid for the new session. Specifically, the new session can be used to query the security hardware circuitry to receive a new volatile attribute of the key. The query can return the new volatile attribute of the key and the new volatile attribute of the key can be stored in the data structure.

Figure 6:
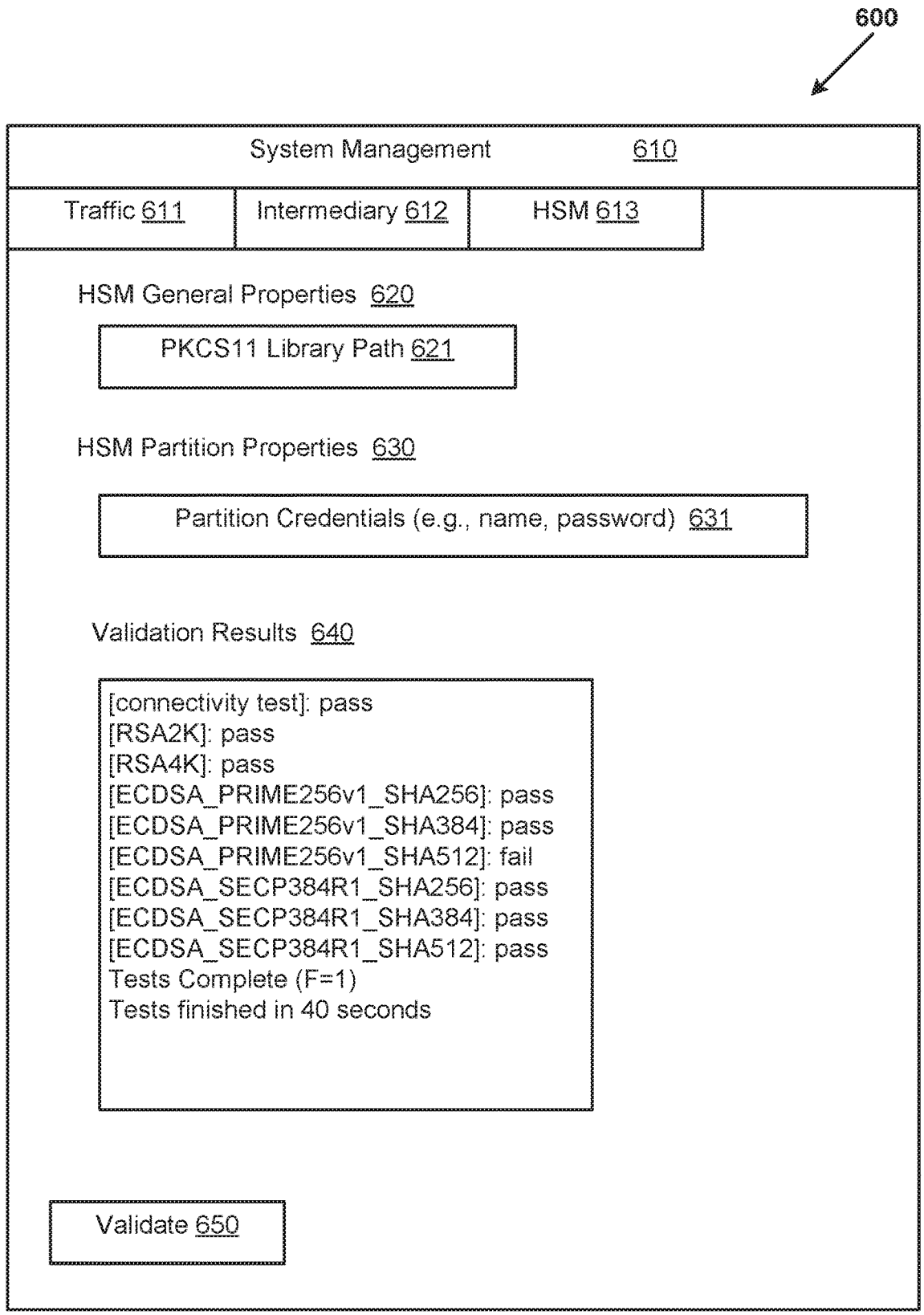
FIG. 6 illustrates an example user interface for validating operations of an intermediary server computer using security hardware circuitry, such as a hardware security module.

FIG. 6 illustrates an example user interface 600 for validating operations of an intermediary server computer using security hardware circuitry, such as an HSM. For example, the user interface 600 can be implemented by executing software routines on the intermediary server computer 110. For example, computer-executable instructions for carrying out a method for rendering an output and capturing an input of the user interface 600 can be stored in a computer-readable memory of the intermediary server computer, and the instructions can be executed by a processor of the intermediary server computer to carry out the method.

As TLS and SSL traffic become more common over public networks such as the Internet, a robust key management solution can lead to higher performing and more secure application server infrastructure, where the application server infrastructure can include an intermediary server computer and/or an application server computer. For example, an enterprise can use an HSM to perform offloaded cryptographic operations to potentially increase a performance and confidentiality for the application server infrastructure. The broader adoption of HSMs can increase a number of vendors offering an HSM which can make it more time consuming for a development team to validate and integrate all of the different HSMs with the application server infrastructure. Specifically, the resources used for validation can increase as the number of vendors and the number of different product versions these vendors support increase. Lack of validation resources can cause delays in the product development cycle and can limit choice for a customer of the application server infrastructure. For example, when only released versions of vendor HSMs are tested by the infrastructure provider, the compatibility of the HSM with the other infrastructure can be one or more revisions behind the latest released version.

However, enabling vendors to perform all or a portion of the validation and integration of the HSM with the infrastructure can reduce an impact on the development team of the infrastructure and can reduce delays associated with validating an HSM so that customers have access to more current revisions of hardware and software for the HSMs and potentially more choice of HSM vendors. A validation framework can enable HSM vendors to validate the integrability of the HSM with the application server infrastructure. The framework can specify an integration interface and a validation testing tool that vendors can incorporate into their development cycle. As described in more detail below in reference to FIG. 7, the integration can include a pre-certification performed by the vendor and a final certification performed by either the vendor or the provider of the application server infrastructure.

The user interface 600 can provide a unified integration interface as well as a validation testing utility that an HSM vendor can use during integration. As one example, the user interface 600 can include a title bar 610 indicating a category of functionality (e.g., system management) provided by the user interface. Within the category, there can be multiple tabs that indicate subtopics of the category. As illustrated, there is a network traffic tab 611, an intermediary server tab 612, and an HSM tab 613. The HSM tab 613 is selected. When a given tab is selected, options and output associated with the subtopic can be presented. For example, a general properties entry area 620 can be used to specify general properties about the HSM, such as a library path 621. The library path 621 can indicate where software routines for executing the communication protocol with the HSM can be located. As another example, the partition properties entry area 630 can be used to specify various properties for identifying and/or accessing a token of the HSM. For example, credentials 631 for logging into a given partition can be entered using the partition properties entry area 630. The validation results output area 640 can provide a log and/or a status of validation testing of the HSM. The validation testing can include multiple tests for testing various functionality used by the server application infrastructure and exercising functionality of the HSM and its associated software libraries. The validate button 650 can be clicked to begin validation testing.

Figure 7:
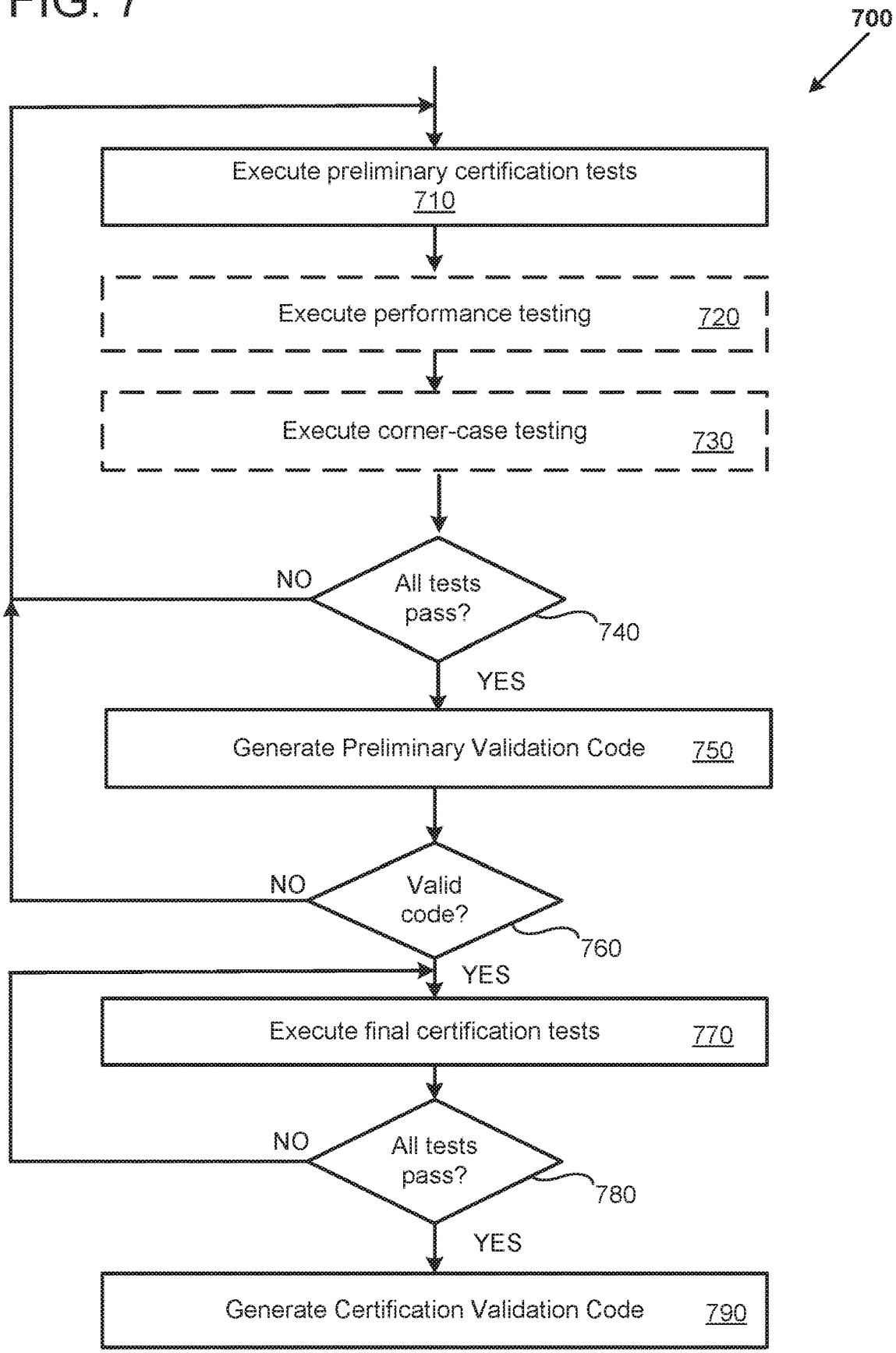
FIG. 7 is a flowchart of an example method of certifying security hardware circuitry as being compatible with an intermediary server computer.

FIG. 7 is a flowchart of an example method 700 of certifying a hardware security module as being compatible with an intermediary server computer. For example, the method 700 can be implemented by executing software routines executing on the intermediary server computer 110. For example, computer-executable instructions for carrying out the method 700 can be stored in a computer-readable memory of the intermediary server computer, and the instructions can be executed by a processor of the intermediary server computer to perform the method 700. As another example, the method 700 can be implemented using software routines of the verification logic 390 of FIG. 3.

At 710, a list of preliminary certification tests can be executed. For example, the execution of the preliminary certification test can be initiated by an HSM vendor clicking a validate button on a user interface used for certification testing. The preliminary certification tests can include tests that validate core functionality used by the server application infrastructure. As one example, a connection test can validate that the HSM is properly connected to the intermediary server computer and that basic communication can occur between the HSM and the intermediary server computer. The connection test can include verifying that account credentials can be transferred between the intermediary server computer and HSM. The preliminary certification tests can include tests to validate that frequently used cryptographic operations can be performed by the HSM and that the results from those cryptographic operations can be passed back to the intermediary server computer. As specific examples, the preliminary certification tests can include tests to validate decryption, digital signing, key creation, key deletion, and key attribute setting.

At 720, a level of performance between the HSM and the intermediary server computer can optionally be validated. As one example, an average transactions per second can be calculated for different operations performed by the HSM. For example, the performance can be measured for encryption and/or decryption using different cipher types, such as variants of RSA and ECC. The performance tests can pass when the average transactions per second exceed a threshold value for transactions per second for a given operation or set of operations. In one embodiment, the performance tests can pass when all performance tests pass for each of the different operations. In another embodiment, the performance test can pass when an overall performance that accounts for different mixes of operations exceeds a threshold.

At 730, various corner cases can optionally be tested. For example, the corner case tests can validate whether the HSM performs correctly during various operational conditions. The operational conditions may not be as common as the conditions tested during the preliminary certification tests. As one example, the corner cases can test the HSM under conditions that may indicate major revisions of the HSM hardware and/or software are appropriate if the corner-case test fails. As another example, the corner cases can test known failure modes of HSMs, such as when the network connectivity is interrupted between the HSM and the intermediary server computer. Different IP rules or other networking tools can be used to disable and enable the connectivity between the HSM and the intermediary server computer.

At 740, it can be determined whether the executed tests (e.g., the preliminary certification tests) have all passed. Additionally, a universal report can be generated for different network/cloud HSM vendors which may geographically located in different areas, including on-premises local data centers and the remote data centers operated by HSM vendors and/or service providers. The report can provide a normalized set of performance parameters so that different vendors can be compared using the same methodology and tests. Using the comprehensive report, customers can both validate the HSM, and choose the HSM vendor based on performance metrics so that the customer can verify their HSM key storage/operation usage criteria will be met. If all of the executed tests have not passed, the method 700 can continue at 710 so that the tests can be re-executed after modifications have been made to the HSM hardware and/or software. If all of the executed tests pass, the method 700 can continue at 750.

At 750, a preliminary validation code can be generated. The preliminary validation code can indicate that the HSM has passed the initial tests and can receive a precertification status. For example, the precertification status can gate whether the development team of the intermediary server computer will perform additional testing of the HSM. By having the intermediary server computer development team wait to perform integration testing until after the precertification status is achieved, resources of the intermediary server computer development team can be reserved until the HSM is performing at an appropriate level of performance. The preliminary validation code can be encoded such that the preliminary validation code is not easily forged. As one example, the preliminary validation code can be generated from a checksum or hash code of the HSM software libraries and digitally signed using a private key of the intermediary server computer. The HSM software libraries and be identified using the text entry box provided by the user interface of the certification tool.

At 760, the preliminary validation code can be verified. For example, the preliminary validation code can be verified by the intermediary server computer development team when an HSM vendor provides it software and/or hardware for final certification. For example, the validation code can be regenerated using the software libraries provided by the HSM vendor and the same algorithm that was used to generate the original preliminary validation code. If the libraries are unmodified from when the preliminary validation code was generated then the preliminary validation code will be the same as the regenerated validation code. If the preliminary validation code and the regenerated validation code are the same, the preliminary validation code is verified, and the method 700 can continue at 770. However, if the validation codes are different (e.g., the code is not validated), the method 700 can continue at 710.

At 770, the final certification tests can be executed. The final certification tests are any tests used by the intermediary server computer development team to validate the HSM hardware and/or software as compatible with the intermediary server computer. Alternatively, the final certification tests can be executed by the vendor of the HSM. For example, the final certification tests can be initiated automatically after the preliminary certification tests are determined to pass. At 780, it can be determined whether all of the final certification tests have passed. All of the tests pass, the method 700 can continue at 790. However, if any tests fail, the method 700 can continue at 770.

At 790, a certification validation code can be generated. Similar to the preliminary validation code, the certification validation code can be generated using a hash code and/or a checksum of the HSM software libraries. The hash code and/or checksum can be digitally signed and/or encrypted using a private key of the intermediary server computer provider. In this manner, certification of an HSM can be automated so that development resources of the intermediary server computer development team can be reduced. By using encrypted and/or signed validation codes, the integrity of the testing can be maintained and a one-click validation process can be enabled. Specifically, the one click can be performed by an HSM vendor using the user interface 600 and initiating the validation process by clicking the validate button 650. The validation process can automatically execute the preliminary certification tests, and if they pass, can continue executing the final certification tests. The certification validation code can indicate to customers and providers of the intermediary server computer that the HSM is compatible with the intermediary server computer. In other words, the certification validation code can represent a "stamp of approval" by a vendor of the intermediary server computer that the HSM has been tested for compatibility with the intermediary server computer and that the HSM passed the compatibility testing.

Example Computing Environments

Figure 8:
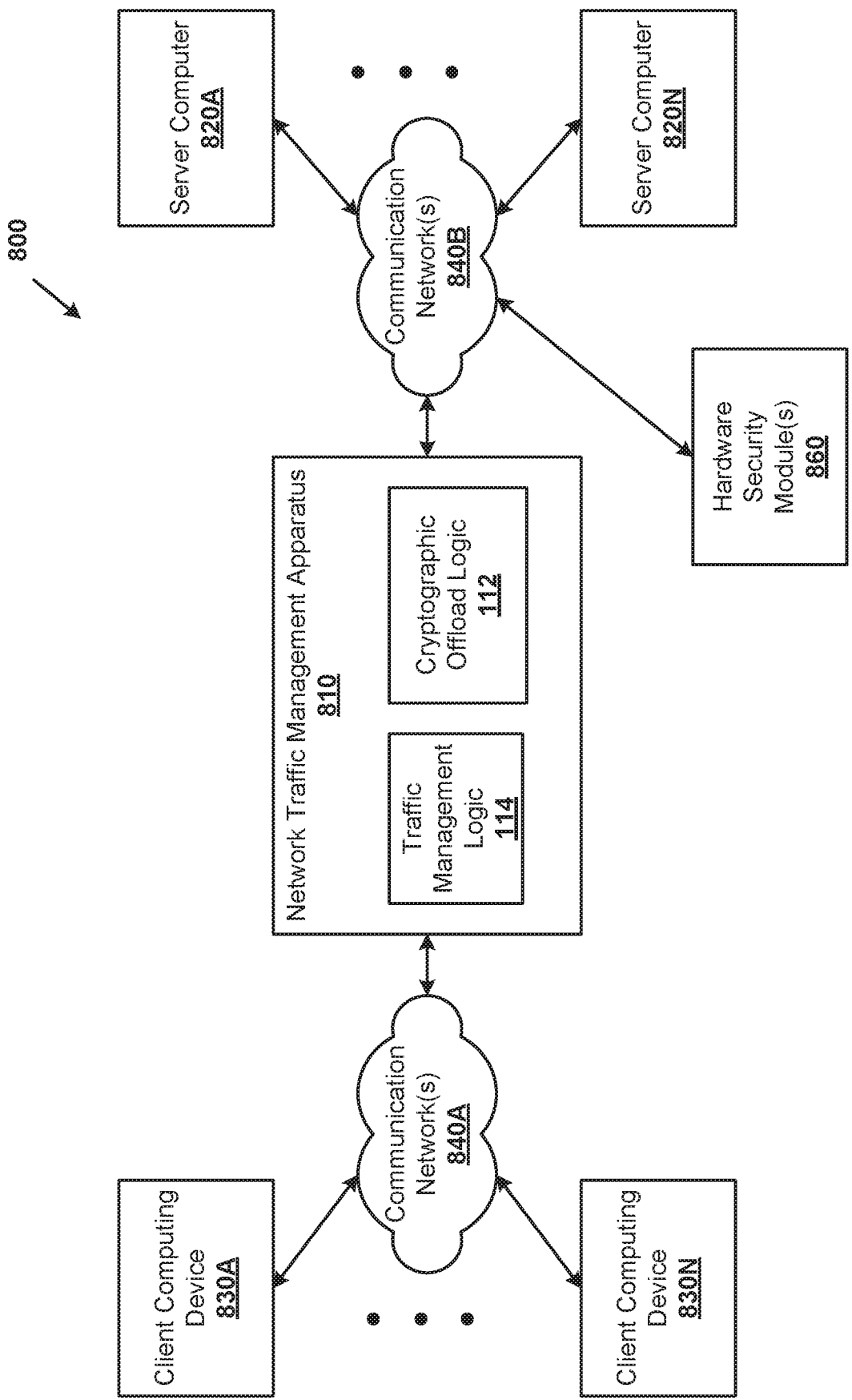
FIG. 8 is a block diagram of an example client-server architecture including a network traffic management apparatus including security hardware circuitry, such as a hardware security module.

FIG. 8 illustrates an example client-server architecture 800 (also referred to as a network traffic management system in FIG. 8) that incorporates a network traffic management apparatus 810 and security hardware circuitry (e.g., a hardware security module 860). The client-server architecture 800 includes a network traffic management apparatus 810 that is coupled to one or more server computers (such as server computers 820A-N), and one or more client devices (such as client computing devices 830A-N), and the HSM 860 via one or more communication networks (such as the communication networks 840A and 840B). The server computers 820A-N can communicate with one or more additional server computer(s) that are accessible via the communication networks 840A. As one example, the communication network 840A can include a public network (e.g., the Internet) and devices attached to the network 840A can be accessed using public network addresses; the communication network 840B can include a private network and devices attached to the network 840B can be accessed using private network addresses.

The communication networks 840A-B can include various wired and/or wireless communication technologies, such as a local area network (LAN), a wide area network (WAN), an intranet, the Internet, a public switched telephone network (PSTN), and so forth. The devices connected to the communication networks 840A-B can communicate with each other using various communications protocols, such as transmission control protocol with Internet protocol (TCP/IP) over Ethernet and/or other customized or industry-standard protocols. The communication protocols can be used to transmit information over the networks 840A-B using packet-based messages (e.g., Ethernet-based packet data networks) and/or other application programming interfaces (APIs). An API is a programmatic interface (e.g., a set of methods and/or protocols) for communicating among different modules. The communication networks 840A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 810 is positioned in-line between the client computing devices 830A-N and the server computers 820A-N so that the network traffic management apparatus 810 can intercept all network traffic flowing between the different networks 840A and 840B. In other examples, the network traffic management apparatus 810, the server computer 820A-N, and the client devices 830A-N can be coupled together via other topologies. As one specific example, the server computers 820A-N can be integrated within the network traffic management system 800 (e.g., server computer functions can be implemented in software within one or more devices of the network traffic management apparatus 810). It should be appreciated by one of ordinary skill in the art having the benefit of the present disclosure, that the network topology illustrated in FIG. 8 has been simplified and that multiple networks and networking devices can be utilized to interconnect the various computing systems disclosed herein. Additionally, one or more of the devices of the client-server architecture 800 in these examples can be in a same or a different communication network including one or more public, private, or cloud networks, for example.

Generally, the server computers 820A-N, the hardware security module(s) 860, the client devices 830A-N, and the network traffic management system 800 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 830A-N can include any type of computing device that can exchange network data, such as mobile communication devices, laptop computers, desktop computers, tablet computers, virtual machines executing within a cloud-computer-based environment, and so forth. The client devices 830A-N can run interface applications, such as web browsers or standalone client applications, which may provide an interface to communicate with (e.g., make requests for, and receive content stored on) one or more of the server computers 820A-N via the communication network(s) 840A and 840B. The client devices 830A-N can further include an output device (such as a display screen or touchscreen (not illustrated)) and/or an input device (such as a keyboard (not illustrated)). Additionally, one or more of the client devices 830A-N can be configured to execute software code (e.g., JavaScript code within a web browser) in order to log client-side data and provide the logged data to the network traffic management apparatus 810 or the server computers 820A-N.

The server computers 820A-N can include any type of computing device that can exchange network data. For example, the server computers 820A-N can exchange network data with the client devices 830A-N, with each other, and/or with the hardware security module(s) 860. As another example, the server computers 820A-N can exchange communications along communication paths specified by application logic in order to facilitate a client-server application interacting with the client devices 830A-N. Examples of the server computers 820A-N can include application servers, database servers, access control servers, and encryption servers. Accordingly, in some examples, one or more of the server computers 820A-N process login and other requests received from the client devices 830A-N via the communication network(s) 840A and 840B according to the Hypertext Transfer Protocol (HTTP) or Hypertext Transfer Protocol Secure (HTTPS) application-layer protocol. A web application may be operating on one or more of the server computers 820A-N and transmitting data (e.g., files or web pages) to the client devices 830A-N (e.g., via the network traffic management apparatus 810) in response to requests from the client devices 830A-N. The server computers 820A-N can be hardware and/or software and may represent a system with multiple servers in a pool, which may include internal or external networks.

While the server computers 820A-N are illustrated as single devices, one or more actions of each of the server computers 820A-N may be distributed across one or more distinct network computing devices that together comprise one or more of the server computers 820A-N. Moreover, the server computers 820A-N are not limited to a particular configuration. Thus, the server computers 820A-N may contain network computing devices that operate using a coordinated approach, whereby one of the network computing devices of the server computers 820A-N operate to manage or otherwise coordinate operations of the other network computing devices. Each of the server computers 820A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 820A-N can operate within the network traffic management apparatus 810 itself rather than as a stand-alone server device communicating with the network traffic management apparatus 810 via communication network 840B. In this example, the one or more of the server computers 820A-N operate within the memory of the network traffic management apparatus 810.

The network traffic management apparatus 810 can include any type of computing device that can be used for managing network traffic. The network traffic management apparatus 810 can perform a number of functions, including providing network security, access control, load balancing network traffic across the server computers 820A-N, and/or accelerating network traffic associated with an application hosted by one or more of the server computers 820A-N, for example. For example, the network traffic management apparatus 810 can include traffic management logic 114 that is used to perform proxy and other services on behalf of the server 820A-N and to manage traffic between the clients 830A-N and the servers 820A-N. The network traffic management apparatus 810 includes a cryptographic offload module 112 that is used to offload cryptographic operations to the hardware security module(s) 860. Additionally, the network traffic management apparatus 810 can include other network devices such as one or more routers or switches, for example In one example, the network traffic management apparatus 810 can be a dedicated computing device including a processor (not illustrated) and a computer-readable memory (not illustrated). The memory of the network traffic management apparatus 810 can store one or more applications that can include computer-executable instructions that, when executed by the network traffic management apparatus 810, cause the network traffic management apparatus 810 to perform actions, such as to transmit, receive, or otherwise process messages, for example, and to perform other actions described and illustrated above with reference to FIGS. 1A, 1B, and 2-7. Specifically, the memory can include computer-executable instructions for performing the functions of offloading cryptographic operations to the hardware security module(s) 860 and accessing cryptographic keys stored on the hardware security module(s) 860. The application(s) can be implemented as components of other applications. Further, the application(s) can be implemented as operating system extensions, plugins, or the like.

While the network traffic management apparatus 810 is illustrated in this example as including a single device, the network traffic management apparatus 810 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 810. Additionally, the network traffic management apparatus 810 and/or the application(s) executed by the network traffic management apparatus 810 can be operative in a cloud-based computing environment. The application(s) can be executed within or as virtual machine(s) or virtual server(s) that can be managed in a cloud-based computing environment. For example, the application(s), and even the network traffic management apparatus 810 itself, can be located in virtual server(s) running in a cloud-based computing environment rather than being tied to one or more specific physical network computing devices. Also, the application(s) can be running in one or more virtual machines (VMs) executing on the network traffic management apparatus 810. Additionally, in one or more examples of this technology, virtual machine(s) running on the network traffic management apparatus 810 can be managed or supervised by a hypervisor. Additionally, one or more of the components that together comprise the network traffic management apparatus 810 can be standalone devices or integrated with one or more other devices or apparatuses, such as with one or more of the server computers 820A-N, for example.

Additionally, one or more of the components depicted in the client-server architecture 800, such as the network traffic management apparatus 810, server computers 820A-N, hardware security module(s) 860, or client computing devices 830A-N, for example, may be configured to operate as virtual instances on the same physical machine. In other words, one or more of the network traffic management apparatus 810, server computers 820A-N, hardware security module(s) 860, or client computing devices 830A-N may operate on the same physical device rather than as separate devices communicating through communication networks 840A and 840B. Additionally, there may be more or fewer network traffic management apparatuses, client computing devices, or server computers than illustrated in FIG. 8.

Figure 9:
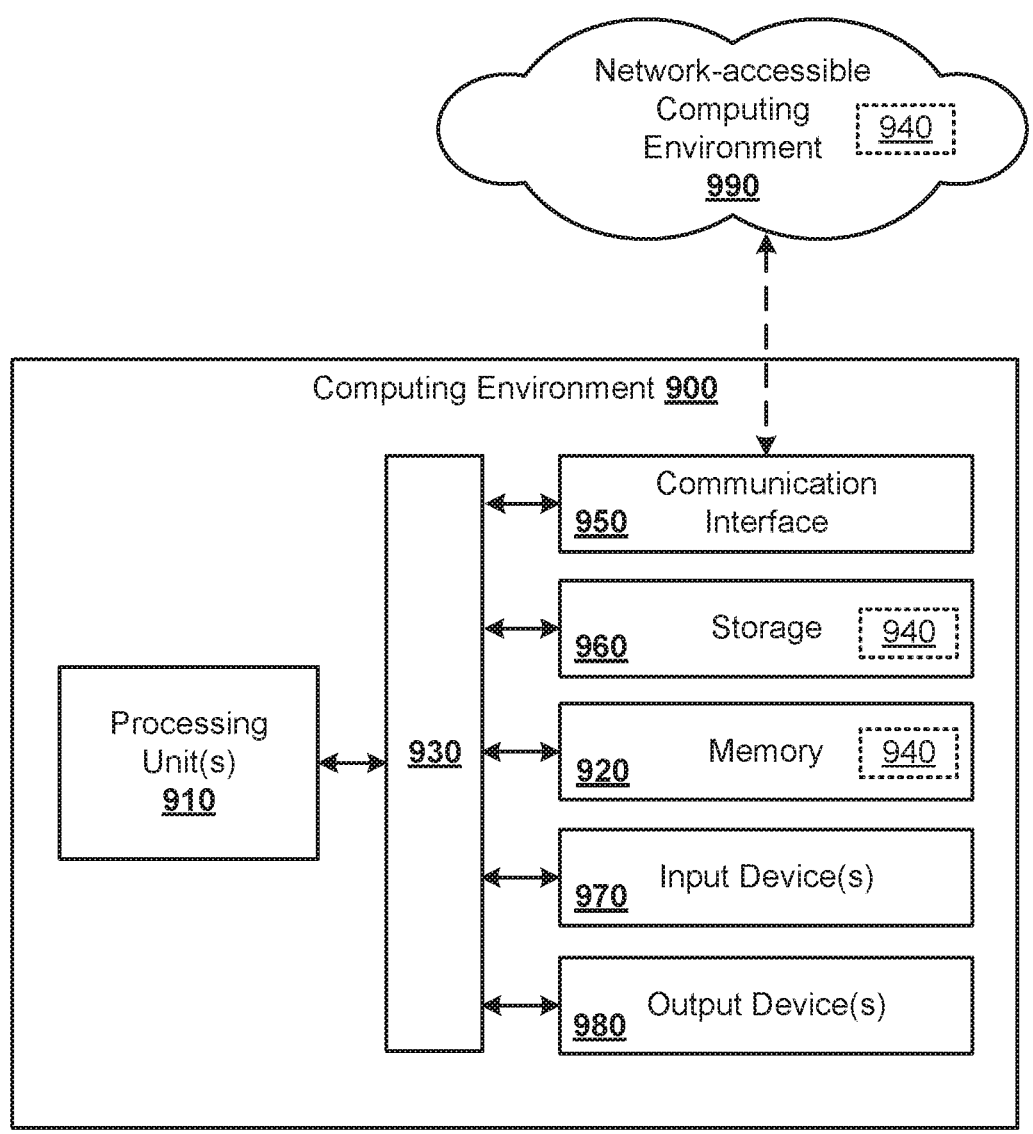
FIG. 9 is a block diagram of an example computing environment, such as can be used for an intermediary server computer.

FIG. 9 illustrates a block diagram of a generalized example of a suitable computing environment 900 that can be used to implement the examples, techniques, and technologies described herein. For example, the computing environment 900 can be used to implement a network traffic management apparatus including an intermediary server that performs the disclosed techniques for offloading cryptographic operations and accessing cryptographic keys stored on a hardware security module.

The computing environment 900 includes at least one processing unit 910 and computer-readable memory 920, which are coupled together by an interconnect 930. The processing unit 910 executes computer-executable instructions. The processing unit 910 can include a general-purpose processor, a special-purpose processor, and combinations thereof. For example, the processing unit 910 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 920 stores software 940 implementing one or more innovations described herein, in the form of computer-executable instructions suitable for execution by the processing unit 910. Specifically, the memory 920 can be used to store computer-executable instructions, data structures, input data, output data, and other information. The memory 920 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 920 can include operating system software (not illustrated). Operating system software can provide an operating environment for other software executing in the computing environment 900 and can coordinate activities of the components of the computing environment 900.

The interconnect 930 is used to connect different components of the computing environment 900 together so that the processing unit 910 can communicate with the different components and/or so that the different components can communicate with each other. For example, the interconnect 930 can include a bus, controller, and/or a network. As one example, the interconnect 930 can include a host bridge (also referred to as a northbridge) for connecting the processing unit 910 to relatively high-speed components (such as the memory 920) and an input/output bridge (also referred to as a southbridge) for connecting to relatively lower-speed components (such as a communications interface 950) within the computing environment 900. In some examples, one or more components of the computing environment 900 can be integrated within or connected directly to the processing unit 910.

The computing environment 900 can include a communication interface 950 for communicating with another computing entity using a communication medium (e.g., a physical layer). The communication interface 950 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 950 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 950 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 8, a communication interface of the network traffic management apparatus 810 operatively couples to and communicates with the communication networks 840A and 840B so that the network traffic management apparatus 810 is coupled to and can communicate with the server computers 820A-N, hardware security module(s) 860, and the client computing devices 830A-N.

The computing environment 900 can include storage 960 that is used to store instructions for the software 940, data structures, and data, which can be used to implement the technologies described herein. The storage 960 can include electronic circuitry for reading and/or writing to removable or non-removable storage media using magnetic, optical, or other reading and writing system that is coupled to the processor. The storage 960 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 900.

The computing environment 900 can include input device(s) 970. For example, the input device(s) 970 can provide an input interface to a user of the computing environment 900 and/or to receive inputs from a physical environment. The input device(s) 970 can include a tactile input device (e.g., a keyboard, a mouse, or a touchscreen), a microphone, a camera, a sensor, or another device that provides input to the computing environment 900.

The computing environment 900 can include output device(s) 980. For example, the output device(s) 980 can provide an output interface to a user of the computing environment 900 and/or to generate an output observable in a physical environment. The output device(s) 980 can include a light-emitting diode, a display, a printer, a speaker, a CD-writer, or another device that provides output from the computing environment 900. In some examples, the input device(s) 970 and the output device(s) 980 can be used together to provide a user interface to a user of the computing environment 900.

The computing environment 900 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 910 and the network-accessible computing environment 990 that is linked through a communications network. In a distributed computing environment, program modules 940 (including executable instructions for offloading cryptographic operations and accessing cryptographic keys stored on a hardware security module) can be located in both local and remote memory storage devices.

The term computer-readable media includes non-transient media for data storage, such as memory 920 and storage 960, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A secure communications method implemented in cooperation with a network traffic management system comprising one or more network traffic management modules, networking modules, or server modules, the method comprising:
   receiving an initial request to perform a first cryptographic operation using a key stored in security hardware circuitry, the initial request identifying the key using a persistent attribute of the key;
   in response to servicing the initial request, using the persistent attribute of the key to query the security hardware circuitry by a thread of execution to receive a volatile handle for the key from the security hardware circuitry, wherein the volatile handle for the key changes during a lifetime of the key;
   storing the volatile handle for the key in association with the thread of execution external to the security hardware circuitry to enable subsequent requests by the thread of execution to perform cryptographic operations on the security hardware circuitry without querying the security hardware circuitry for the volatile handle for the key;
   receiving a subsequent request to perform a second cryptographic operation using the key stored in the security hardware circuitry, the subsequent request identifying the key using the persistent attribute of the key; and
   servicing the subsequent request by using the thread of execution and the security hardware circuitry, and identifying the key using the stored volatile handle for the key associated with the thread of execution without querying the security hardware circuitry for the volatile handle for the key.

2. The method of claim 1, wherein the security hardware circuitry is a hardware security module.

3. The method of claim 1, wherein communication with the security hardware circuitry is performed using a Public Key Cryptography Standard.

4. The method of claim 1, wherein the persistent attribute of the key is a name of the key and the volatile handle for the key is a key handle assigned by the security hardware circuitry for the thread of execution accessing the security hardware circuitry using a given session.

5. The method of claim 1, wherein the thread of execution is a first thread of a plurality of threads of execution, and the method further comprises:
   in response to the first thread receiving the volatile handle for the key, performing a plurality of queries of the security hardware circuitry for the remaining plurality of threads of execution to obtain a respective volatile handle for the key for each thread of the remaining plurality of threads of execution; and
   storing the respective volatile handles for the key for the remaining plurality of threads of execution in a data structure external to the security hardware circuitry.

6. The method of claim 1, further comprising:
   detecting that the volatile handle for the key is invalid;
   in response to detecting that the volatile handle for the key is invalid, performing a new query of the security hardware circuitry to receive a new volatile handle for the key, the new query identifying the key using the persistent attribute of the key; and
   storing the new volatile handle for the key in a data structure external to the security hardware circuitry.

7. The method of claim 1, further comprising:
   detecting that a session associated with the key is no longer valid;
   establishing a new session with the security hardware circuitry;
   using the new session, querying the security hardware circuitry to receive a new volatile handle for the key; and
   storing the new volatile handle for the key in a data structure external to the security hardware circuitry.

8. A system comprising one or more network traffic management modules, networking modules, or server modules, memory comprising programmed instructions stored thereon, and one or more processors configured to execute the stored programmed instructions to:
   receive an initial request to perform a first cryptographic operation using a key stored in security hardware circuitry, the initial request identifying the key using a persistent attribute of the key;
   in response to servicing the initial request, use the persistent attribute of the key to query the security hardware circuitry by a thread of execution to receive a volatile handle for the key from the security hardware circuitry, wherein the volatile handle for the key changes during a lifetime of the key;

store the volatile handle for the key in association with the thread of execution external to the security hardware circuitry to enable subsequent requests by the thread of execution to perform cryptographic operations on the security hardware circuitry without querying the security hardware circuitry for the volatile handle for the key;

receive a subsequent request to perform a second cryptographic operation using the key stored in the security hardware circuitry, the subsequent request identifying the key using the persistent attribute of the key; and service the subsequent request by using the thread of execution and the security hardware circuitry, and identifying the key using the stored volatile handle for the key associated with the thread of execution without querying the security hardware circuitry for the volatile handle for the key.

9. The system of claim 8, wherein the persistent attribute of the key is a name of the key and the volatile handle for the key is a key handle assigned by the security hardware circuitry for the thread of execution accessing the using a given session.

10. The system of claim 8, wherein the security hardware circuitry is a hardware security module.

11. The system of claim 8, wherein the thread of execution is a first thread of a plurality of threads of execution, and the one or more processors are further configured to be capable of executing the stored programmed instructions to:

in response to the first thread receiving the volatile handle for the key, perform a plurality of queries of the security hardware circuitry for the remaining plurality of threads of execution to obtain a respective volatile handle for the key for each thread of the remaining plurality of threads of execution; and store the respective volatile handles for the key for the remaining plurality of threads of execution in a data structure external to the security hardware circuitry.

12. The system of claim 8, wherein the one or more processors are further configured to be capable of executing the stored programmed instructions to:

detect that the volatile handle for the key is invalid;

in response to detecting that the volatile handle for the key is invalid, perform a new query of the security hardware circuitry to receive a new volatile handle for the key, the new query identifying the key using the persistent attribute of the key; and store the new volatile handle for the key in a data structure external to the security hardware circuitry.

13. The system of claim 8, wherein the one or more processors are further configured to be capable of executing the stored programmed instructions to:

detect that a session associated with the key is no longer valid;

establish a new session with the security hardware circuitry;

use the new session, querying the security hardware circuitry to receive a new volatile handle for the key; and store the new volatile handle for the key in a data structure external to the security hardware circuitry.

14. A non-transitory computer readable medium having stored thereon instructions for secure communications comprising executable code that, when executed by one or more processors, causes the processors to:

receive an initial request to perform a first cryptographic operation using a key stored in security hardware circuitry, the initial request identifying the key using a persistent attribute of the key;

in response to servicing the initial request, use the persistent attribute of the key to query the security hardware circuitry by a thread of execution to receive a volatile handle for the key from the security hardware circuitry, wherein the volatile handle for the key changes during a lifetime of the key;

store the volatile handle for the key in association with the thread of execution external to the security hardware circuitry to enable subsequent requests by the thread of execution to perform cryptographic operations on the security hardware circuitry without querying the security hardware circuitry for the volatile handle for the key;

receive a subsequent request to perform a second cryptographic operation using the key stored in the security hardware circuitry, the subsequent request identifying the key using the persistent attribute of the key; and service the subsequent request by using the thread of execution and the security hardware circuitry, and identifying the key using the stored volatile handle for the key associated with the thread of execution without querying the security hardware circuitry for the volatile handle for the key.

15. The non-transitory computer readable medium of claim 14, wherein the thread of execution is a first thread of a plurality of threads of execution, and the instructions further comprise executable code that, when executed by one or more processors, causes the processors to:

in response to the first thread receiving the volatile handle for the key, perform a plurality of queries of the security hardware circuitry for the remaining plurality of threads of execution to obtain a respective volatile handle for the key for each thread of the remaining plurality of threads of execution; and store the respective volatile handles for the key for the remaining plurality of threads of execution in a data structure external to the security hardware circuitry.

16. The non-transitory computer readable medium of claim 14, wherein the instructions further comprise executable code that, when executed by one or more processors, causes the processors to:

detect that the volatile handle for the key is invalid;

in response to detecting that the volatile handle for the key is invalid, perform a new query of the security hardware circuitry to receive a new volatile handle for the key, the new query identifying the key using the persistent attribute of the key; and store the new volatile handle for the key in a data structure external to the security hardware circuitry.

17. The non-transitory computer readable medium of claim 14, wherein the instructions further comprise executable code that, when executed by one or more processors, causes the processors to:

detect that a session associated with the key is no longer valid;

establish a new session with the security hardware circuitry;

use the new session, querying the security hardware circuitry to receive a new volatile handle for the key; and store the new volatile handle for the key in a data structure external to the security hardware circuitry.

18. A network traffic management apparatus, comprising memory comprising programmed instructions stored thereon and one or more processors configured to execute the stored programmed instructions to:

receive an initial request to perform a first cryptographic operation using a key stored in security hardware circuitry, the initial request identifying the key using a persistent attribute of the key;

in response to servicing the initial request, use the persistent attribute of the key to query the security hardware circuitry by a thread of execution to receive a volatile handle for the key from the security hardware circuitry, wherein the volatile handle for the key changes during the lifetime of the key;

store the volatile handle for the key in association with the thread of execution external to the security hardware circuitry to enable subsequent requests by the thread of execution to perform cryptographic operations on the security hardware circuitry without querying the security hardware circuitry for the volatile handle for the key;

receive a subsequent request to perform a second cryptographic operation using the key stored in the security hardware circuitry, the subsequent request identifying the key using the persistent attribute of the key; and service the subsequent request by using the thread of execution and the security hardware circuitry, and identifying the key using the stored volatile handle for the key associated with the thread of execution without querying the security hardware circuitry for the volatile handle for the key.

19. The network traffic management apparatus of claim 18, wherein communication with the security hardware circuitry is performed using a Public Key Cryptography Standard.

20. The network traffic management apparatus of claim 18, wherein the thread of execution is a first thread of a plurality of threads of execution, and the one or more processors are further configured to be capable of executing the stored programmed instructions to:

in response to the first thread receiving the volatile handle for the key, perform a plurality of queries of the security hardware circuitry for the remaining plurality of threads of execution to obtain a respective volatile handle for the key for each thread of the remaining plurality of threads of execution; and store the respective volatile handle for the key for the remaining plurality of threads of execution in a data structure external to the security hardware circuitry.

21. The network traffic management apparatus of claim 18, wherein the one or more processors are further configured to be capable of executing the stored programmed instructions to:

detect that the volatile handle for the key is invalid;

in response to detecting that the volatile handle for the key is invalid, perform a new query of the security hardware circuitry to receive a new volatile handle for the key, the new query identifying the key using the persistent attribute of the key; and store the new volatile handle for the key in a data structure external to the security hardware circuitry.

22. The network traffic management apparatus of claim 18, wherein the one or more processors are further configured to be capable of executing the stored programmed instructions to:

detect that a session associated with the key is no longer valid;

establish a new session with the security hardware circuitry;

use the new session, querying the security hardware circuitry to receive a new volatile handle for the key; and store the new volatile handle for the key in a data structure external to the security hardware circuitry.

* * * * *